(12) United States Patent
Tadakuma et al.

(10) Patent No.: US 7,003,202 B2
(45) Date of Patent: Feb. 21, 2006

(54) METHOD AND SYSTEM FOR MEASURING THE WAVELENGTH DISPERSION AND NONLINEAR COEFFICIENT OF AN OPTICAL FIBER, METHOD OF MANUFACTURING OPTICAL FIBERS, METHOD OF MEASURING WAVELENGTH-DISPERSION DISTRIBUTION, METHOD OF COMPENSATING FOR MEASUREMENT ERRORS, AND METHOD OF SPECIFYING CONDITIONS OF MEASUREMENT

(75) Inventors: Masateru Tadakuma, Tokyo (JP); Yu Mimura, Tokyo (JP); Misao Sakano, Tokyo (JP); Osamu Aso, Tokyo (JP); Takeshi Nakajima, Tokyo (JP); Katsutoshi Takahashi, Tokyo (JP)

(73) Assignee: The Furukawa Electric Co., Ltd., (JP)

( * ) Notice: Subject to any disclaimer, the term of this patent is extended or adjusted under 35 U.S.C. 154(b) by 0 days.

(21) Appl. No.: 10/832,875

(22) Filed: Apr. 27, 2004

(65) Prior Publication Data

US 2005/0058417 A1 Mar. 17, 2005

Related U.S. Application Data

(60) Provisional application No. 60/465,991, filed on Apr. 28, 2003.

(51) Int. Cl.
*G01N 21/00* (2006.01)

(52) U.S. Cl. .............. 385/122; 398/28; 398/29; 356/73.1

(58) Field of Classification Search ............. 356/73.1; 385/24, 37, 122; 398/25, 28, 29
See application file for complete search history.

(56) References Cited

U.S. PATENT DOCUMENTS 6,771,360 B1 * 8/2004 Kawabata .............. 356/73.1

* cited by examiner

*Primary Examiner*—John D. Lee
*Assistant Examiner*—Rhonda S. Peace
(74) *Attorney, Agent, or Firm*—Cantor Colburn LLP

(57) ABSTRACT

A method of simultaneously specifying the wavelength dispersion and nonlinear coefficient of an optical fiber. Pulsed probe light and pulsed pump light are first caused to enter an optical fiber to be measured. Then, the power oscillation of the back-scattered light of the probe light or idler light generated within the optical fiber is measured. Next, the instantaneous frequency of the measured power oscillation is obtained, and the dependency of the instantaneous frequency relative to the power oscillation of the pump light in a longitudinal direction of the optical fiber is obtained. Thereafter, a rate of change in the longitudinal direction between phase-mismatching conditions and nonlinear coefficient of the optical fiber is obtained from the dependency of the instantaneous frequency. And based on the rate of change, the longitudinal wavelength-dispersion distribution and longitudinal nonlinear-coefficient distribution of thee optical fiber are simultaneously specified.

5 Claims, 15 Drawing Sheets

METHOD AND SYSTEM FOR MEASURING THE WAVELENGTH DISPERSION AND NONLINEAR COEFFICIENT OF AN OPTICAL FIBER, METHOD OF MANUFACTURING OPTICAL FIBERS, METHOD OF MEASURING WAVELENGTH-DISPERSION DISTRIBUTION, METHOD OF COMPENSATING FOR MEASUREMENT ERRORS, AND METHOD OF SPECIFYING CONDITIONS OF MEASUREMENT

CROSS-REFERENCE TO RELATED APPLICATION

The present application claims the benefit of the date of the earlier filed provisional application, having U.S. Provisional Application Ser. No. 60/465,991, filed on Apr. 28, 2003, which is incorporated herein in its entirety.

BACKGROUND OF THE INVENTION

1. Field of the Invention

The present invention relates to a method and system for measuring the wavelength dispersion and nonlinear coefficient of an optical fiber, a method of manufacturing optical fibers, a method of measuring wavelength-dispersion distribution, a method of compensating for measurement errors, and a method specifying the measuring conditions.

2. Description of the Related Art

With the liberalization of the field of information communication and the development of information society, there is a tendency for the amount of information to increase exponentially. By practical use of erbium-doped fiber amplifiers (EDFAs) and Raman fiber amplifiers that directly amplify light, optical signals of extremely high power can be obtained in the band of wavelength 1.55 µm. This can make up for the transmission losses in optical fibers and make repeaterless transmission possible over thousands of kilometers. By employing such a light amplification technique, wavelength-division multiplexing (WDM) and time-division multiplexing (TDM) have been investigated. Also, in optical repeatered systems employing optical amplifiers, nonlinear optical effects become problems as optical signals of high power pass through optical fibers. Nonlinear effects that arise within optical fibers are self-phase modulation (SPM), cross-phase modulation (CPM), four-wave mixing (FWM), etc., which adversely affect transmission quality. The magnitude of nonlinear effects is determined by the nonlinear coefficient of an optical fiber, so it is necessary to measure the value with a high degree of accuracy. The nonlinear coefficient is expressed by the following Equation:

$$\gamma = \frac{2\pi}{\lambda} \frac{n_2}{A_{\mathit{eff}}}$$

where $\lambda$ is the Wavelength of light, $n_2$ is the nonlinear refractive index of an optical fiber, and $A_{\mathit{eff}}$ is the effective area of the optical fiber. The nonlinear effects in optical fibers are evaluated by the value of $\gamma$ or $n_2/A_{\mathit{eff}}$.

In a method of measuring the nonlinear coefficient, it can be calculated by causing the pulsed light from a light source to enter an optical fiber, and measuring phase modulation from a change in a power spectral waveform caused by self-phase modulation (see R. H. Stolen and Chinlon Lin, Physical Review A, Vol. 17, No. 4, pp. 1448–1453 (1992)). This method generally is called self-phase modulation method (hereinafter referred to as SPM method).

In addition, by employing two light sources that generate two optical signals with different wavelengths, coupling the two optical signals into a beat pulse, and causing the beat pulse to enter an optical fiber to be measured, the nonlinear coefficient of the optical fiber can be calculated from a change in the light spectrum caused by SPM. This method generally is called CW-SPM method.

Furthermore, by causing probe light and frequency-modulated pump light to enter an optical fiber, detecting the probe light through delayed self-heterodyne detection, and detecting the phase of the probe light modulated by the pump light, the nonlinear coefficient of the optical fiber can be calculated (see A. Wada et al., ECOC92, p. 42 (1992)). This method generally is called cross-phase modulation method (hereinafter referred to as XPM method).

In WDM communication, the most important nonlinear effect is four-wave mixing (FWM). If side bands caused by FWM overlap the wavelengths of other signals, they will generate crosstalk among optical channels, and noise that can limits WDM systems. FWM tends to occur in optical fibers whose nonlinear effects are great, and it is also known that particularly, when an optical signal is in the vicinity of the zero-dispersion wavelength of an optical fiber, FWM can take place easily.

On the other hand, the suppression of FWM against wavelength dispersion in optical transmission lines conflicts with the conditions of waveform distortion due to wavelength dispersion. To solve such a problem, there has been proposed a dispersion compensating system in which local wavelength dispersion in an optical transmission line is not zero, but an optical fiber with positive wavelength dispersion and another optical fiber with negative wavelength dispersion are combined so that the wavelength dispersion of the entire transmission line becomes close to zero.

In designing and constricting such a dispersion compensating system, it is necessary to design the nonlinear and dispersion properties of an optical transmission line with a high degree of accuracy. In design, an optimum fiber combination is often obtained from the average wavelength dispersion and fiber length of an optical fiber.

However, the wavelength dispersion of an optical fiber being actually used is not always uniform at a certain wavelength in the fiber longitudinal direction. The prime cause is errors in manufacturing optical fibers and cables, etc. For that reason, in high data rate and high spectral density transmission with strict restrictions, there are cases where a logical design does not coincide with the state of transmission in optical fibers being practically used.

Therefore, in such a case, the wavelength-dispersion distribution in the longitudinal direction of an optical fiber employed in a dispersion compensating system needs to be grasped accurately and reflected in design.

Methods of measuring the wavelength-dispersion distribution in the longitudinal direction of an optical fiber have been studied in view of the circumstances mentioned above. So far, an optical time-domain reflectometer (OTDR) utilizing linear effects, a method utilizing FWM, etc., have been proposed. A description will hereinafter be given of the principles of the method, utilizing FWM, which measures wavelength-dispersion distribution. The most widely used measurement method measures the back-scattered light of idler light generated by FWM within an optical fiber, and calculates dispersion from the cycle of the power variation (see Optics Letters 1996, 21, pp. 1724–1726 and Japanese Laid-Open Patent Publication No. Hei 8-21783). This method is called a nonlinear OTDR.

Normally, equations describing degenerated four-wave mixing (DFWM) are nonlinear coupled-mode Eqs. (1) to (3).

$$\frac{dE_p}{dz} + \frac{1}{2}\alpha E_p = \quad (1)$$
$$i\gamma|(|E_p|^2 + 2|E_s|^2 + 2|E_c|^2)E_p + 2E_p^*E_sE_c\exp(i\Delta\beta z)|$$

$$\frac{dE_s}{dz} + \frac{1}{2}\alpha E_s = \quad (2)$$
$$i\gamma|(|E_s|^2 + 2|E_c|^2 + 2|E_p|^2)E_s + 2E_c^*E_p^2\exp(-i\Delta\beta z)|$$

$$\frac{dE_c}{dz} + \frac{1}{2}\alpha E_c = \quad (3)$$
$$i\gamma|(|E_c|^2 + 2|E_p|^2 + 2|E_s|^2)E_c + 2E_s^*E_p^2\exp(-i\Delta\beta z)|$$

where p is pump light, s is probe light, c is idler light, $\alpha$ is the degree of loss in an optical fiber, and $\gamma$ is the nonlinear coefficient of the optical fiber ($\gamma=(2\pi/\lambda) \cdot (n_2/A_{eff})$ where $\lambda$ is the wavelength of light, $n_2$ is the nonlinear refractive index of the optical fiber, and $A_{eff}$ is the effective cross section of the core of the optical fiber). $\Delta\beta$ is the phase mismatching condition of a propagation constant $$\Delta\beta = \beta_s + \beta_c - 2\beta_p \quad (4)$$

With regard to frequency, $\Delta\beta$ is assumed to meet the phase matching condition $$2\omega_p = \omega_s + \omega_c \quad (5)$$

where $\omega_p$, $\omega_s$, and $\omega_c$ are the angular frequencies of pump light, probe light, and idler light, respectively.

Because it is difficult to calculate the strict solutions of Eqs. (1) to (3) (nonlinear coupled-mode equations), consideration is given by employing the following approximate solutions.

1) Transmission losses do affect as FWM occurs.
2) The effects of SPM and XPM are not considered.

In view of these, the following Equations (6) to (8) are obtained.

$$\frac{dE_p}{dz} = 0 \quad (6)$$

$$\frac{dE_s}{dz} = 0 \quad (7)$$

$$\frac{dE_c}{dz} i\gamma E_s^* E_p^2 \exp(-i\Delta\beta z) \quad (8)$$

where $E_p$ is the electric field of pump light of wavelength $\lambda_p$, $E_s$ is the electric field of probe light of wavelength $\lambda_s$, $E_c$ is the electric field of idler light of wavelength $\lambda_c$, $P_p^0$ is the power of input pump light of wavelength $\lambda_p$, $P_s^0$ is the power of input probe light of wavelength $\lambda_s$, and $\Delta\lambda$ is the spacing between the two input wavelengths.

Therefore, the electric field and power of idler light at a position of z in the longitudinal direction are given by the following Eqs. (9) and (10):

$$E_c = \frac{\gamma E_s^* E_p^2}{\Delta\beta}\{1 - \exp(-i\Delta\beta z)\} \quad (9)$$

$$P_c = 4\left(\frac{\gamma^2 P_s P_p^2}{\Delta\beta^2}\right)\sin^2\left(\frac{\Delta\beta z}{2}\right) \quad (10)$$

In view of transmission losses of pump light, probe light, and idler light, the power of the back-scattered light of idler light received after the fiber distance z is expressed by the following Eq. (11):

$$P_c(z) \propto \left(\frac{\lambda_p}{Dc\Delta\lambda^2}\right)^2\left(\frac{n_2 P_p^0}{A_{eff}}\right)^2 RP_s^0 \sin^2(\Delta\beta z/2)\exp(-4\alpha z) \quad (11)$$

where R=Rayleigh scattering coefficient, $\alpha$=loss coefficient, and D=dispersion.

The relationship between the phase mismatching condition $\Delta\beta$ and the dispersion D at the wavelength of pump light is expressed by the following Eq. (12):

$$\Delta\beta = \frac{\lambda_p^2}{2\pi c}D(\lambda_p)(\omega_c - \omega_p)^2 = \frac{\lambda_p^2}{2\pi c}D(\lambda_p)(\omega_p - \omega_s)^2 \quad (12)$$

Employing $\lambda=2\pi c/\omega$, Eq. (12) can be expressed by the following Eq. (13):

$$\Delta\beta = -2\pi cD(\lambda_p)\left(\frac{\Delta\lambda}{\lambda_p}\right)^2 \quad (13)$$

And the dispersion D is expressed by the following Eq. (14):

$$D(\lambda_p, z) = \frac{2n}{c^2}\left(\frac{\lambda_p}{\Delta\lambda}\right)^2 f\left[t = \left(\frac{2n}{c}\right)z\right] \quad (14)$$

where f(t) is the instantaneous frequency of the waveform of the back-scattered light of idler light at time t.

With the high-speed operations and increase in WDM capacity in recent years, the design of optical transmission line requires more strict control. For that reason, the optical transmission line design based on the average wavelength dispersion and nonlinear coefficient of a certain length of fiber, being currently used, needs to consider variations in the wavelength dispersion in the longitudinal direction of an optical fiber. At the same time, when the nonlinear coefficient of an optical fiber also varies in the fiber longitudinal direction, variations in the nonlinear coefficient also affect transmission pulses. For that reason, when making a design more accurately, it is necessary to measure nonlinear-coefficient distribution as well as wavelength-dispersion distribution.

However, at present, there is no means of measuring variations in the nonlinear coefficient in the longitudinal direction of an optical fiber. Therefore, there is no possibility that actual measurement will be made. For that reason, it is unknown how the nonlinear coefficient of an optical fiber being presently used varies and also unknown how the variation affects optical transmission characteristics. Therefore, there is no investigation of how variations in the nonlinear coefficient in the longitudinal direction of an optical fiber affect the design of optical transmission lines and other optical transmission analyses.

However, the nonlinear coefficient of an optical fiber is a significant parameter that characterizes optical transmission characteristics, so it is vital to investigate variations in the nonlinear coefficient in the longitudinal direction of an optical fiber. Because of this, there is a strong demand for the development of a method and system for measuring the properties (dispersion, nonlinear effects, etc.) of optical fibers that can contribute to the development of next-generation transmission lines, and fiber devices that need to adjust for the wavelength dispersion and nonlinear coefficient.

In addition, a change in the diameter of glass when being drawing into fiber form is considered to be the main cause of variations in the wavelength dispersion in the fiber longitudinal direction produced when manufacturing optical fibers. The refractive-index distribution of the base material of an optical fiber to be drawn into fiber form can be measured by a preform analyzer, so the drawing operation is performed based on the result of measurement so that target wavelength dispersion is obtained. However, since there is an error in the accuracy of finishing in the fiber material or a measurement error in the preform analyzer, not a few variations will arise in the fiber longitudinal direction. Likewise, from the viewpoint of manufacturing optical fibers, a fiber manufacturing method that is stable and good in yield rate is requested, and a fiber-property evaluating method therefor is also requested.

BRIEF SUMMARY OF THE INVENTION

The present invention has been made in order to solve the above-described problems. Accordingly, the primary object of the invention is to make it possible to measure the wavelength-dispersion distribution and nonlinear-coefficient distribution in the longitudinal direction of an optical fiber to be measured, by making use of nonlinear optical effects that occur in the optical fiber.

To achieve this end and in accordance with a first aspect of the present invention, there is provided a measurement method including a step of generating pulsed probe light linearly polarized, and pulsed pump light that is different in wavelength from the probe light but has the same polarization state; a step of causing the probe light and the pump light to enter an optical fiber to be measured; and a step of measuring power oscillation of back-scattered light of the probe light caused by Rayleigh scattering, or power oscillation of back-scattered light of idler light caused by nonlinear effects generated within the optical fiber. The measurement method further includes a step of obtaining an instantaneous frequency of the measured power oscillation; a step of obtaining dependency of the instantaneous frequency relative to the power oscillation of the pump light in a longitudinal direction of the optical fiber; a step obtaining a rate of change in the longitudinal direction between phase-mismatching conditions and nonlinear coefficient of the optical fiber, from the dependency of the instantaneous frequency; and a step of simultaneously specifying distributions in the longitudinal direction of the wavelength dispersion and nonlinear coefficient of the optical fiber, based on the rate of change.

In the measurement method of the present invention, a discrimination between the positive and negative of the wavelength dispersion in the longitudinal direction of the optical fiber may be made by employing conditions on wavelengths and powers of the pulsed pump light and pulsed probe light that are input to the optical fiber.

In the measurement method of the present invention, average wavelength dispersion and average nonlinear coefficient of the entire optical fiber may be simultaneously specified by measuring an average value of the power oscillation of the idler light at a pulse exit side of the optical fiber, measuring dependency of the conversion efficiency of the idler light relative to the power oscillation of input pulsed pump light on the basis of the measure average value, and performing a regression analysis of the conversion efficiency with a logic function representing the conversion efficiency of the idler light dependent on the power oscillation of the pump light on the basis of the measured dependency.

In the measurement method of the present invention, influence of variations in polarization within the optical fiber may be removed by measuring longitudinal wavelength-dispersion distribution and longitudinal nonlinear-coefficient distribution at both ends of the optical fiber and comparing the measured two distributions.

In the measurement method of the present invention, predetermined amounts of data near both ends of the optical fiber may be deleted from the power oscillation data of the idler light or pulsed probe light. And the power oscillation data after the deletion may be analyzed.

In accordance with a second aspect of the present invention, there is provided a measurement system including a pump light source for generating pump light; a probe light source for generating probe light; and a modulator for pulsing the pump light and/or the probe light. The measurement system further includes a first coupler, light-receiving means, and calculation means. The first coupler is used for coupling the pulsed pump light and the pulsed probe light together and inputting them to an optical fiber to be measured. The light-receiving means is used for wavelength-selecting either back-scattered light of the pulsed probe light occurring within the optical fiber or back-scattered light of the pulsed idler light occurring within the optical fiber, after the pulsed pump light and the pulsed probe light are input to the optical fiber, and outputting an electric signal representing a waveform of the selected scattered light. The calculation means is used for calculating wavelength-dispersion distribution and nonlinear-coefficient distribution in a longitudinal direction of the optical fiber from a waveform of the electric signal.

The measurement system of the present invention may further include optical amplification means for amplifying the aforementioned pulsed pump light.

The measurement system of the present invention may further include branch means and an acoustooptic modulator. The branch means is used for branching the probe light generated by the probe light source into first light and second light. The acoustooptic modulator is used for frequency-shifting the probe light by pulsing the first light. The aforementioned light-receiving means may have a second coupler that couples back-scattered light of the pulsed probe light output from the acoustooptic modulator, and the second light branched by the branch means.

The measurement system of the present invention may further include Raman amplification means, which is used for causing idler light different in wavelength from the pump light and probe light to enter either end or both ends of the optical fiber, and Raman-amplifying the pulsed pump light, the pulsed probe light, and the idler light.

The measurement system of the present invention may further include a power measuring unit, disposed on a pulse exit side of the optical fiber, for measuring power oscillation of idler light.

The measurement system of the present invention may further include a nonlinear optical medium provided between the first coupler and the optical fiber.

In the measurement system of the present invention, the aforementioned pump light source and the aforementioned probe light source may generate pump light and probe light that have linear polarizations parallel to each other. And the aforementioned first coupler may couple the pump light and the probe light so that their polarization planes coincide with each other.

In the measurement system of the present invention, the aforementioned pump light source and the aforementioned probe light source may generate pump light and probe light that have linear polarizations parallel to each other. The aforementioned first coupler may couple the pump light and the probe light so that their polarization planes coincide with each other. And the aforementioned second coupler may couple back-scattered light of the probe light, back-scattered light of the pulsed probe light output from the acoustooptic modulator, and the second light branched by the branch means so that their polarization states are parallel to one another.

In accordance with a third aspect of the present invention, there is provided a method comprising the steps of: measuring wavelength-dispersion distribution and nonlinear-coefficient distribution in a longitudinal direction of an optical fiber drawn into fiber form, by employing the measurement system as set forth in any one of claims 6 to 13; and cutting off the optical fiber so that either the measured wavelength-dispersion distribution or the measured nonlinear-coefficient distribution, or both are within ±5% of an average value of the entire length of the optical fiber.

In accordance with a fourth aspect of the present invention, there is provided a method of measuring wavelength-dispersion distribution in a longitudinal direction of an optical fiber to be measured. The method comprises the steps of extracting waveform data of an optical signal propagating within the optical fiber for each of a plurality of regions; nonlinearly fitting the waveform data extracted for the regions to a sinusoidal function; respectively calculating dispersions of the waveform data extracted for the regions; and measuring the wavelength-dispersion distribution.

In accordance with a fifth aspect of the present invention, there is provided a method of compensating for a measurement error that occurs in measuring wavelength-dispersion distribution in a longitudinal direction of an optical fiber to be measured. The method includes the step of compensating for the measurement error by employing oscillation power of input pump light, oscillation power of input signal light, conditions of measuring spacing between the input pump light and the input signal light, a nonlinear coefficient of the optical fiber, and oscillation power of idler light of a measuring object.

In accordance with a sixth aspect of the present invention, there is provided a method of specifying measuring conditions that are set in measuring wavelength-dispersion distribution in a longitudinal direction of an optical fiber to be measured. The method includes the step of specifying the measuring conditions, based on wavelength dispersion and nonlinear coefficient of the optical fiber.

BRIEF DESCRIPTION OF THE DRAWINGS

The present invention will be described in further detail with reference to the accompanying drawings wherein.

DETAILED DESCRIPTION OF THE INVENTION

Figure 1:
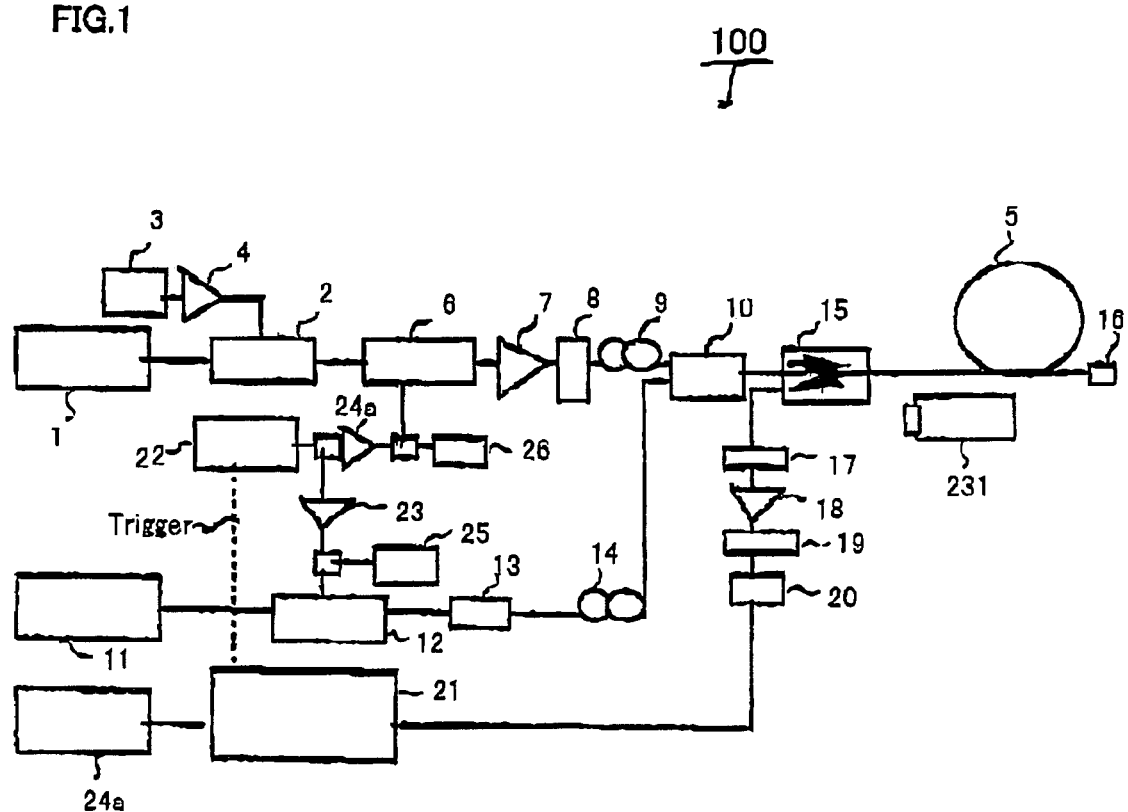
FIG. 1 is a block diagram showing a measurement system constructed in accordance with a first embodiment of the present invention.

Initially, a description will be given of the principles of a method that measures the longitudinal nonlinear-coefficient distribution and wavelength-dispersion distribution of an optical fiber when four-wave mixing occurs in the optical fiber.

In conventional methods that measure the longitudinal wavelength-dispersion distribution of an optical fiber, the influence of nonlinear effects such as self-phase modulation and cross-phase modulation is not considered. In embodiments of the present invention, a measuring system for producing these nonlinear effects is constructed in order to calculate the nonlinear coefficient of an optical fiber. Also, the influence of nonlinear effects in the measuring system is measured in the fiber longitudinal direction. Based on the result of measurement, the longitudinal wavelength-dispersion distribution and nonlinear-coefficient distribution of the optical fiber are simultaneously measured. Now, a description will be given of the solution derived by Stolen and Bjorkholm (hereinafter referred to as SB solution) when the nonlinear effects on probe light and idler light by the self-phase modulation and cross-phase modulation caused by pump light are not negligible. The SB solution is characterized in that it contains nonlinear effects, such as self-phase modulation and cross-phase modulation, caused by pump light. And this SB solution is established when the power of pump light is extremely high. However, this SB solution does not take the transmission losses in optical fibers into consideration. The basic equations for the SB solution are given by the following Eqs. (15) to (17):

$$\frac{dE_p}{dz} = i\gamma |E_p|^2 E_p \tag{15}$$

$$\frac{dE_s}{dz} = i\gamma [2|E_p|^2 E_s + E_c^* E_p^2 \exp(-\Delta\beta z)] \tag{16}$$

$$\frac{dE_c}{dz} = i\gamma [2|E_p|^2 E_c + E_s^* E_p^2 \exp(-\Delta\beta z)] \tag{17}$$

Also, the power $P_c(z)$ of idler light and power $P_s(z)$ of probe light after a distance of z are expressed as follows:

Case A: When $\Delta\beta < 0$ (anomalous dispersion) and $P_p^0 > -\Delta\beta/4\gamma$, Idler light (18)

$$P_c(z) = \frac{4\gamma^2 P_p^{0^2} P_s^0}{-\Delta\beta(\Delta\beta + 4\gamma P_p^0)} \sinh^2(g_a z)$$

Probe light (19)

$$P_s(z) = P_s^0 \left(1 - \frac{4\gamma^2 P_p^{0^2}}{\Delta\beta(\Delta\beta + 4\gamma P_p^0)} \sinh^2(g_a z)\right)$$

where $$g_a = \frac{1}{2}[-\Delta\beta(\Delta\beta + 4\gamma P_p)]^{\frac{1}{2}} \tag{20}$$

$P_s^0$ represents the power of incident probe light, and $P_p^0$ represents the power of incident pump light.

Case B: When $\Delta\beta < 0$ (anomalous dispersion) and $P_p^0 > -\Delta\beta/4\gamma$, or when $\Delta\beta \geq 0$ (normal dispersion)

Idler light (21)

$$P_c(z) = \frac{4\gamma^2 P_p^{0^2} P_s^0}{\Delta\beta(\Delta\beta + 4\gamma P_p^0)} \sin^2(g_b z)$$

Probe light (22)

$$P_s(z) = P_s^0 \left(1 + \frac{4\gamma^2 P_p^{0^2}}{\Delta\beta(\Delta\beta + 4\gamma P_p^0)} \sin^2(g_b z)\right)$$

where $$g_b = \frac{1}{2}[\Delta\beta(\Delta\beta + 4\gamma P_p)]^{\frac{1}{2}} \tag{23}$$

From Eqs. (18), (19) and (21), (22) it is found that the powers $P_c(z)$ and $P_s(z)$ of idler light and probe light that propagate in the fiber longitudinal direction vary in dependence on $\Delta\beta$, $\gamma$, and the power $P_p$ of pump light. Hence, as in the case where Mollenaure et al. pay attention to $g_a$ and $g_b$ of the back-scattered light of idler light in Eq. (11) and calculate $\Delta\beta$ from $g_a$ and $g_b$, if in Eqs. (18), (19) and Eqs. (21), (22) the power of the back-scattered light of idler light or probe light is measured and $g_a$ and $g_b$ after a distance of z are calculated, information on the dispersion or nonlinear coefficient is obtained from $g_a$ and $g_b$.

As set forth above, in the above-described SB solution, transmission losses in optical fibers are not considered. Because $g_a$ and $g_b$ of the probe light or idler light depend on the power of pump light, transmission losses $g_a$ and $g_b$ will vary. For that reason, when calculating $\Delta\beta$ and $\gamma$ accurately, transmission losses must be considered. There are two methods of taking the effect of transmission losses into Eqs, (18) to (23).

Case C:

The power of pump light at points in the fiber longitudinal direction is calculated from the power of input pump light and fiber loss coefficient d. And by employing these values, $g_a$ and $g_b$ are calculated. In the above-described two cases, (C1) When $\Delta\beta < 0$ (anomalous dispersion) and $P_p^0 > -\Delta\beta/4\gamma$, $$g_a = \frac{1}{2}[-\Delta\beta(\Delta\beta + 4\gamma P_p \exp(-\alpha z))]^{\frac{1}{2}} \tag{24}$$

(C2) When $\Delta\beta < 0$ (anomalous dispersion) and $P_p^0 > -\Delta\beta/4\gamma$, or when $\Delta\beta \geq 0$ (normal dispersion), $$g_b = \frac{1}{2}[\Delta\beta(\Delta\beta + 4\gamma P_p \exp(-\alpha z))]^{\frac{1}{2}} \tag{25}$$

Case D:

The power $P_p(z)$ of pump light at points in the fiber longitudinal direction is actually measured by measuring the back-scattered light of pump light. And by employing these values, $g_a$ and $g_b$ are calculated. As with the case C, (D1) When $\Delta\beta < 0$ (anomalous dispersion) and $P_p^0 > -\Delta\beta/4\gamma$, $$g_a = \frac{1}{2}[-\Delta\beta(\Delta\beta + 4\gamma P_p \exp(z))]^{\frac{1}{2}} \tag{26}$$

(D2) When $\Delta\beta < 0$ (anomalous dispersion) and $P_p^0 > -\Delta\beta/4\gamma$, or when $\Delta\beta \geq 0$ (normal dispersion), $$g_b = \frac{1}{2}[\Delta\beta(\Delta\beta + 4\gamma P_p(z))]^{\frac{1}{2}} \tag{27}$$

In the case of optical fibers where the fiber loss coefficient d is great, or in the case of optical fibers where the fiber length is long and therefore the total loss is great, it is effective to amplify pump light, probe light, and idler light by forward Raman amplification and backward Raman amplification. In such a case, variations in the power in the longitudinal direction of pump light are not a reducing characteristic proportional to the fiber loss coefficient. Therefore, it becomes effective to employ actual measurements, as in the case D.

Two solutions of Eqs. (18), (19) and Eqs. (21), (22) are obtained from the conditions of $\Delta\beta$ and $P_p$, but either solution may be employed. However, for the evaluation of wavelength dispersion, Eqs. (21) and (22) are effective. The reason for that is that the dependency of $g_b$ relative to the power oscillation of pump light varies between the case of anomalous dispersion ($\Delta\beta<0$) and the case of normal dispersion ($\Delta\beta\geq 0$). That is, depending on the positive or negative of $\Delta\beta$, a variation in $g_b$ at the time of an increase in the pump light power decreases in the case of abnormal dispersion ($\Delta\beta<0$) and increases in the case of normal dispersion ($\Delta\beta\geq 0$). Therefore, by measuring an increase or decrease in $g_b$ relative to the power oscillation of pump light, it becomes possible to discriminate between the positive and negative of the wavelength dispersion of an optical fiber. This advantage is unobtainable in the existing methods of measurement.

Referring now to FIG. 1, there is shown a measurement system 100 constructed in accordance with a first embodiment of the present invention. The measurement system 100 is used for simultaneously measuring the wavelength-dispersion distribution and nonlinear coeffcient distribution in the longitudinal direction of an optical fiber to be measured.

Light from a pump light source 1 is phase-modulated by a phase modulator 2. A sinusoidal wave signal with a frequency of 100 MHz or so, output from a sine-wave generator 3, is input to the phase modulator 2 through an electric signal amplifier 4. The phase modulation is performed in order to prevent stimulated Brillouin scattering (SBS) from taking place within an optical fiber 5 to be measured (hereinafter referred to simply as an optical fiber 5). In the case where the power of the pump light incident on the optical fiber 5 is less than or equal to a SBS threshold, phase modulation is not necessary. The signal from the phase modulator 2 is pulsed by a power modulator 6. The cycle f of the pulse applied to the power modulator 6 is determined by the time the pulse takes to go and return the fiber length of the optical fiber 5 and is represented as f=c/2 nL (where L is the fiber length and n is the refractive index of the fiber). The duty ratio of the pulse is about a few %. The pulsed light from the power modulator 6 is amplified by an erbium-doped fiber amplifier (EDFA) 7. The amplified pump light passes through a band-pass filter 8 and a polarization controller 9 and enters a coupler 10. On the other hand, the probe light generated by a probe light source 11 is pulsed by a power modulator 12 in the same manner as the aforementioned pump light and is coupled with the pump light by the coupler 10. At this time, the pump light passes through a delay line 13 and a polarization controller 14 in order to cause the two pulses (of the pump light and probe light) to coincide with each other in timing and state of polarization. The coupled light passes through a circulator 15 and enters the optical fiber 5. The terminal of the optical fiber 5 is connected to a reflectionless end 16. The back-scattered light of the probe light or idler light from the optical fiber 5 passes through the circulator 15, optical filter 17, EDFA 18, and optical filter 19 and is converted into an electric signal by an O/E converter 20. This electric signal is measured by an oscilloscope 21. A trigger signal from a pulse generator 22 is input to the oscilloscope 21. The power of the pump light and power of the probe light that enter the optical fiber 5 are measured at the output port of the circulator 15 by an optical power meter 231. The electric pulse signal required for pulsing the aforementioned pump light and probe light is generated by the pulse generator 22 and is branched into two. The two branched signals are amplified by electric signal amplifiers 23 and 24a, respectively, They are further synthesized with DC voltage components output from DC power sources 25, 26 and are respectively input to the power modulators 12, 6. The electric signal input to the oscilloscope 21 is digitized, and it is input to a computer 24.

Note that the pump light wavelength $\lambda$p, its input power, and probe light wavelength $\lambda$s are suitably set in dependence on the properties of the optical fiber 5 important for communications. The details of the wavelength setting will be described below, but the reason why the wavelength setting is required is that the above-described conditions of measurement and conditions of analysis (conditions of SB solutions) must be met.

Now, steps of measurement by the measurement system 100 will be described. A description will be given of an analysis method employing Eqs. (21), (22), and (23) by which information on the positive and negative of wavelength dispersion is obtained. A vital point in the measurement is that measuring conditions meeting the above-described conditional Equations are set in dependence on the wavelength dispersion and nonlinear coefficient of the optical fiber 5. In setting such measuring conditions, it is also necessary that they be within the capability range of the measurement system 100 that is practically used.

Initially, the flow from the setting of measuring conditions to the final calculation of analyzed data will hereinafter be described.

Measurement 1: Set measuring conditions (see the following) in consideration of the characteristics of the optical fiber 5 and measurement system 100.

Measurement 2: Measure the back-scattered light of pump light with the measurement system 100 and acquire the power in the fiber longitudinal direction of the pump light.

Measurement 3: Measure the waveform of the back-scattered light of probe light or waveform of the back-scattered light of idler light with the measurement system 100.

Measurement 4: Change the power of input pump light a plurality of times and repeat the steps of the measurements 2 and 3

Measurement 5: Calculate $g_b$ at each point in the fiber longitudinal direction from the waveform of the probe light or idler light with the measurement system 100.

And by substituting into Eq. (27) a plurality of $g_b$ values relative to the power of pump light at points in the fiber longitudinal direction obtained in the above-described Measurement 5, $\Delta\beta$ and $\gamma$ are calculated.

Next, a detailed description will be given of the aforementioned measurement 1.

The setting of measuring conditions varies greatly, depending on the properties of an optical fiber important for light transmission. Hence, first consider the setting of measuring conditions in dependence on the type of optical fiber 5 being used.

The setting of measuring conditions is performed on the assumption that the values of the fiber length, average dispersion, and nonlinear coefficient (per fiber length) of the optical fiber 5 are known. The approximate values of the nonlinear coefficient and average wavelength dispersion are typically known, depending on the types of optical fibers being used. Therefore, the minimum information required for the setting of measuring conditions is what the type of optical fiber 5 is, and is the value of the fiber length of the optical fibers. As an example, typical types of 1.55-$\mu$m-band single mode fibers, the wavelength dispersions, and the nonlinear coefficients are listed in Table 1.

TABLE 1

| Fiber Type | Dispersion D (ps/nm/Km) | Nonlinear coefficient $\gamma$ (km$^{-1}$W$^{-1}$) |
|---|---|---|
| DCF (dispersion-compensated fiber) | −150 to −80 | 10.9 |
| RDF (reversed dispersion fiber) | −17 | 4.9 |
| SMF (single mode fiber) | +17 | 1.2 |
| DSF (dispersion-shifted fiber) | −2 to +2 | 2.0 |
| NZ-DSF (non-zero dispersion-shifted fiber) | −4 to −2, +2 to +4 | 2.0 |
| HNLF (high nonlinearity fiber) | −4 to 4 | 20.0 |

The measuring conditions vary, depending on whether $\Delta\beta$ is positive or negative (whether wavelength dispersion is normal or anomalous). Hence, steps 1 to 3 of setting the measuring conditions will be described in dependence on the positive and negative of $\Delta\beta$.

Condition-setting step 1 in the case of anomalous wavelength dispersion ($\Delta\beta<0$):

1—1. Setting of Distance Resolution:

Set the frequency per 1 km of a measured waveform (frequency=number of waves: $g_b$ (km$^{-1}$)/$\pi$) to 2 to 10 (when $P_p=0$ W).

Since $\Delta\beta=-2g_b$ when $P_p=0$ W, $$\Delta\beta(\text{km}^{-1})=-4\pi \text{ to } -20\pi (\equiv\Delta\beta\text{max})$$

1-2. Setting of the Upper Limit Value of Input Pump Light Power:

Calculate power $P_{pmax}$ meeting the critical condition of pump light from the nonlinear coefficient $\gamma$.

$$P_{pmax}=-\Delta\beta_{max}/4\gamma$$

Compare $P_{pmax}$ with the upper limit value $P_{pmeasure}$ of the measurement system.

a) $P_{pmeasure} \leq P_{pmax}$ ->Set upper limit value $$P_{phigh}=P_{pmeasure}$$

b) $P_{pmeasure} > P_{pmax}$ ->Set upper limit value $$P_{phigh}=P_{pmax}$$

1-3. Determination of $\Delta\beta$:

Calculate the spacing $\Delta\lambda$ between the two wavelengths of pump light and probe light with respect to $\Delta\beta$ calculated in the above-described 1—1, using Eq. (13).

a) $\Delta\lambda \leq \Delta\lambda_{max}$(measurement system limit)->Determination of $\Delta\lambda$ b) $\Delta\lambda > \Delta\lambda_{max}$ -> $\Delta\lambda=\Delta\lambda_{max}$(a new $\Delta\beta$ is determined)

1-4. Determination of an Input Pump Light Power Variable Region:

Determine a pump light region where the wave amplitude component A of probe light or idler light ($A=4\gamma^2P_p^2/\{\Delta\beta(\Delta\beta+4\gamma P_p)\}$) is a measurable value.

A measurable limit value $A_{lim}$ is determined in dependence on the receiving sensitivity of the measurement system being used. Assuming the power of pump light is $P_{pmin}$ when $A=A_{lim}$, the region where the power is variable is $$P_{pmin} \leq P_p \leq P_{phigh}$$

1-5. Confirmation of $g_b$ in Probe Light or Idler Light to Be Measured:

Calculate $g_b$ of the waveform of pump light or probe light in the pump light region calculated in the above-described 1-4, using Eq. (23).

$$g_b(P_p=P_{phigh}) \leq g_b \leq g_b(P_p=P_{pmin})$$

Condition-setting step 2 in the case of normal wavelength dispersion ($\Delta\beta>0$):

2-1. Setting of Distance Resolution:

Set the frequency per 1 km of a measured waveform (frequency= number of waves: $g_b$ (km$^{-1}$)/$\pi$) to 2 to 10 (when $P_p=0$ W).

$$\Delta\beta=4\pi \text{ to } 20\pi (\equiv\Delta\beta\text{max})$$

2—2. Determination of $\Delta\beta$:

Calculate the spacing $\Delta\lambda$ between the two wavelengths of pump light and probe light from $\Delta\beta$ determined, using Eq. (13).

a) $\Delta\lambda \leq \Delta\lambda_{max}$(measurement system limit)->Determination of $\Delta\lambda$ b) $\Delta\lambda > \Delta\lambda_{max}$ -> $\Delta\lambda=\Delta\lambda_{max}$ 2-3. Determination of an Input Pump Light Power Variable Region:

Determine a pump light region where the wave amplitude component A of probe light or idler light ($A=4\gamma^2P_p^2/\{\Delta\beta(\Delta\beta+4\gamma P_p)\}$) is a measurable value.

A measurable limit value $A_{lim}$ is determined in dependence on the receiving sensitivity of the measurement system being used. If the power of pump light is assumed to be $P_{pmin}$ when $A=A_{lim}$, the region where the power is variable is $$P_{pmin} \leq P_p \leq P_{phigh}$$

2-4. Confirmation of $g_b$ in Probe Light or Idler Light to Be Measured:

Calculate $g_b$ of the waveform of pump light or probe light in the pump light region calculated in the above-described 2-3, using Eq. (23).

$$g_b(P_p=P_{pmin}) \leq g_b \leq g_b(P_p=P_{phigh})$$

Condition-setting step 3 in the case of optical fibers where it cannot be judged if wavelength dispersion is positive or negative:

Particularly, in the case of optical fibers where the positive and negative of wavelength dispersion vary in the fiber longitudinal direction for reasons of manufacture because average wavelength dispersion is close to zero, as in dispersion-shifted fibers, or in the case of optical fibers where wavelength dispersion is intentionally adjusted in the fiber longitudinal direction (e.g., dispersion-decreasing fibers), it cannot be distinctly decided beforehand if wavelength dispersion is positive or negative. In such a case, as set forth below, it is considered effective to set measuring conditions on the assumption that optical fibers are anomalous dispersion fibers, and correct the set values by experiment. This is because the number of limiting factors becomes greater in the case of anomalous dispersion fibers because of the presence of the critical condition of pump light ($P_p(0)<-\Delta\beta/4\gamma$). On the other hand, the setting of measuring conditions is not always easier in the case of normal dispersion fibers than in the case of anomalous dispersion fibers. In this case, in the same pump light power, a variation in the wave amplitude component of probe light and idler light is smaller and feebler in the case of anomalous dispersion fibers than in the case of normal dispersion fibers where the absolute value of wavelength dispersion is the same but different in sign. For that reason, by correcting the value of $\Delta\beta(\Delta\lambda)$ in a reducing direction from conditions obtained on the assumption that optical fibers are anomalous dispersion fibers, and by making the wave amplitude components of probe light and idler light greater, it becomes necessary to broaden a measurable region. A description will hereinafter be given of the measuring-condition setting steps in the case of optical fibers where it cannot be judged if wavelength dispersion is positive or negative.

3-1. Setting of Distance Resolution:

Set the frequency per 1 km of a measured waveform (frequency=number of waves $g_b$ (km$^{-1}$)/π) to 2 to 10 (when $P_p$=0 W).

$$\Delta\beta=4\pi \text{ to } 20\pi(=\Delta\beta\text{max})$$

3-2. Setting of the Upper Limit Value of Input Pump Light Power:

Calculate power $P_{pmax}$ meeting the critical condition of pump light from the nonlinear coefficient γ.

$$P_{pmax}=-\Delta\beta_{max}/4\gamma$$

Compare $P_{pmax}$ with the upper limit value $P_{pmeasure}$ of the measurement system.

a) $P_{pmeasure} \leq P_{pmax}$ ->Set upper limit value $$P_{phigh}=P_{pmeasure}$$

b) $P_{pmeasure} > P_{pmax}$ ->Set upper limit value $$P_{phigh}=P_{pmax}$$

3—3. Determination of Δβ:

Calculate the spacing Δβ between the two wavelengths of pump light and probe light with respect to Δβ calculated in the above-described 3-1, using Eq. (13).

a) $\Delta\lambda \leq \Delta\lambda_{max}$ (measurement system limit)->Determination of Δλ b) $\Delta\lambda > \Delta\lambda_{max}$ ->$\Delta\lambda=\Delta\lambda_{max}$ (a new Δβ is determined)

3-4. Determination of an Input Pump Light Power Variable Region:

Determine a pump light region where the wave amplitude component A of probe light or idler light ($A=4\gamma^2 P_p^2/\{\Delta\beta(\Delta\beta+4\gamma P_p)\}$) is a measurable value.

A measurable limit value $A_{lim}$ is determined in dependence on the receiving sensitivity of the measurement system being used. Assuming the power of pump light is $P_{pmin}$ when $A=A_{lim}$, the region where the power is variable is $$P_{pmin} \leq P_p \leq P_{phigh}$$

3-5. Confirmation of $g_b$ in Probe Light or Idler Light to Be Measured:

Calculate $g_b$ of the waveform of pump light or probe light in the pump light region calculated in the above-described 3—3, using Eq. (23).

Anomalous dispersion: $g_b(P_p=P_{phigh}) \leq g_b g_b$
$(P_p=P_{pmin})$

Normal dispersion: $g_b(P_p=P_{min}) \leq g_b g_b(P_p=P_{phigh})$

Figure 8:
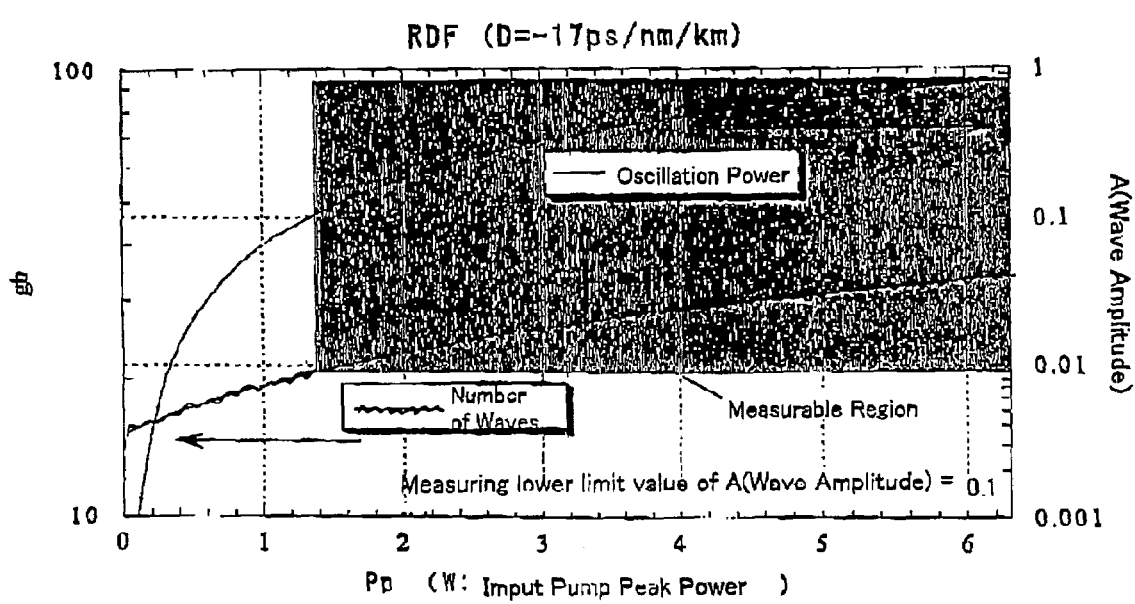
FIG. 8 is a diagram showing the measurable region in a reversed dispersion fiber.
Figure 9:
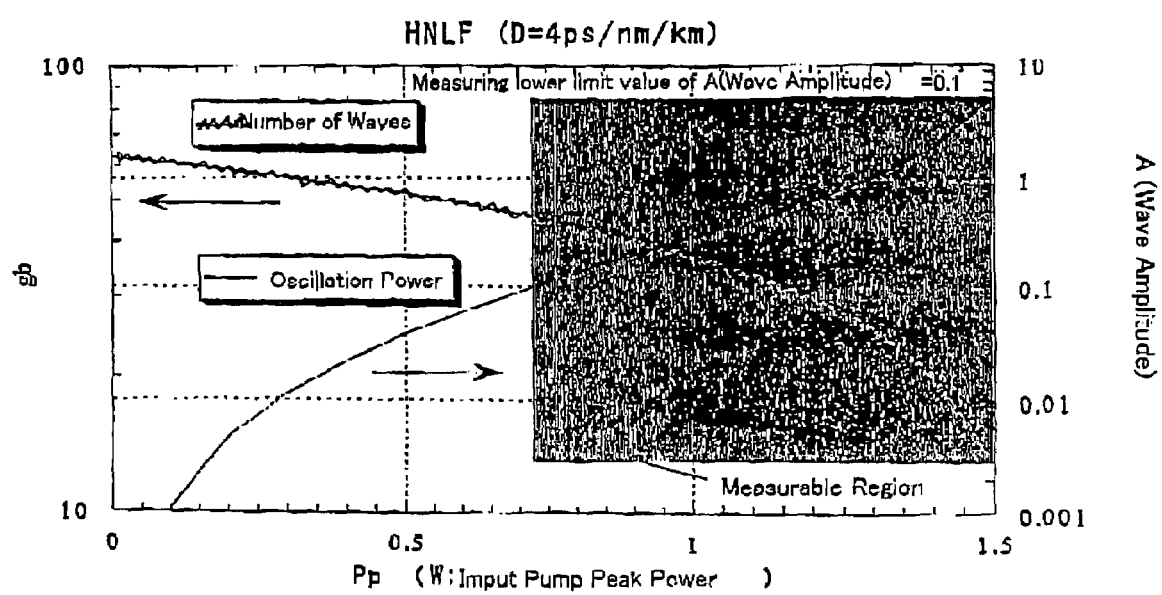
FIG. 9 is a diagram showing the measurable region in a high nonlinearity fiber.

With the measuring-condition setting steps 1 to 3, measuring conditions are set for the optical fiber 5. The results are listed in Tables 2 and 3. Also, in FIGS. 8 and 9, there are shown measurable regions for a reversed dispersion fiber (RDF) with dispersion of −17 ps/nm/km and a high nonlinearity fiber (HNLF) with dispersion of 4 ps/nm/km. The receiving sensitivity of the measurement system 100 is $A_{lim}$=0.1. Since $A_{lim}$ is determined in dependence on the system characteristics of the measurement system 100, the above-described measuring conditions are not to be taken as limiting the present invention.

TABLE 2

| Fiber type | D (ps/nm/km) | γ (km$^{-1}$W$^{-1}$) | Δβ (km$^{-1}$) | Δλ (nm) | $P_p$ (W) region | $g_b$ region | Number of waves measured (km$^{-1}$) |
|---|---|---|---|---|---|---|---|
| SMF | 17 | 1.2 | −30.3 | 1.512 | 3~6 | 10.98~3.37 | 1.74~0.54 |
| DSF | 2 | 2.0 | −50.5 | 5.691 | 3~6 | 18.29~5.62 | 2.91~0.89 |
|  | 1 | 2.0 | −50.5 | 8.049 | 3~6 | 18.29~5.62 | 2.91~0.89 |
|  | 0.1 | 2.0 | −48.7 | 25 | 2.9~6 | 17.62~2.92 | 2.80~0.46 |
| NZ-DSF | 4 | 2.0 | −50.5 | 4.024 | 3~6 | 18.29~5.62 | 2.91~0.89 |
|  | 3 | 2.0 | −50.5 | 4.647 | 3~6 | 18.29~5.62 | 2.91~0.89 |
| HNLF | 4 | 20 | −125.6 | 6.347 | 0.75~1.5 | 57.6~13.26 | 9.15~2.16 |
|  | 3 | 20 | −125.6 | 7.328 | 0.75~1.5 | 57.6~13.26 | 9.15~2.16 |
|  | 2 | 20 | −125.6 | 8.976 | 0.75~1.5 | 57.6~13.26 | 9.15~2.16 |
|  | 1 | 20 | −125.6 | 12.693 | 0.75~1.5 | 57.6~13.26 | 9.15~2.16 |
|  | 0.1 | 20 | −48.7 | 25 | 0.30~0.60 | 17.34~2.92 | 2.76~0.46 |

TABLE 3

| Fiber type | D (ps/nm/km) | γ (km$^{-1}$W$^{-1}$) | Δβ (km$^{-1}$) | Δλ (nm) | $P_p$ (W) region | $g_b$ region | Number of waves measured (km$^{-1}$) |
|---|---|---|---|---|---|---|---|
| DCF | −150 | 10.9 | 125.6 | 1.036 | 2.5~6.3 | 85.83~112.11 | 13.66~17.84 |
|  | −120 | 10.9 | 125.6 | 1.159 | 2.5~6.3 | 85.83~112.11 | 13.66~17.84 |
|  | −100 | 10.9 | 125.6 | 1.269 | 2.5~6.3 | 85.83~112.11 | 13.66~17.84 |
|  | −80 | 10.9 | 125.6 | 1.419 | 2.5~6.3 | 85.83~112.11 | 13.66~17.84 |
| RDF | −17 | 4.9 | 61.74 | 2.158 | 1.4~6.3 | 42.43~53.47 | 6.75~8.51 |
| DSF | −4 | 2.0 | 25.2 | 2.843 | 2.8~6.3 | 17.32~21.82 | 2.76~3.47 |
|  | −3 | 2.0 | 25.2 | 3.283 | 2.8~6.3 | 17.32~21.82 | 2.76~3.47 |
|  | −2 | 2.0 | 25.2 | 4.020 | 2.8~6.3 | 17.32~21.82 | 2.76~3.47 |
|  | −1 | 2.0 | 25.2 | 5.686 | 2.8~6.3 | 17.32~21.82 | 2.76~3.47 |
|  | −0.1 | 2.0 | 24.35 | 17.674 | 2.7~6.3 | 16.73~21.33 | 2.66~3.39 |
| HNLF | −4 | 20.0 | 125.6 | 6.347 | 1.4~6.3 | 86.38~140.60 | 13.75~22.38 |
|  | −3 | 20.0 | 125.6 | 7.328 | 1.4~6.3 | 86.38~140.60 | 13.75~22.38 |
|  | −2 | 20.0 | 125.6 | 8.976 | 1.4~6.3 | 86.38~140.60 | 13.75~22.38 |
|  | −1 | 20.0 | 125.6 | 12.693 | 1.4~6.3 | 86.38~140.60 | 13.75~22.38 |
|  | −0.1 | 20.0 | 48.7 | 25 | 3.0~6.3 | 59.29~82.03 | 9.44~13.06 |

The effects of stimulated Brillouin scattering (SBS) must be considered in setting the maximum input power of pump light. If SBS occurs, the power of light passing through an optical fiber is limited even if the input power of pump light is increased, and it is difficult to accurately measure the power dependency of pump light. Because of this, the input power needs to be set to less than a SBS threshold for optical fibers. The SBS threshold varies depending on the optical properties of the optical fiber 5 (nonlinear effects, etc.) and fiber length, so it is necessary to previously confirm that SBS has not occurred in the optical fiber 5, when making a measurement. To raise the SBS threshold and enlarge the input power of pump light, it is also effective to broaden the spectral linewidth by phase modulation, etc.

After the above-described measurements 1 to 4, the values of $g_b$ at points in the longitudinal direction of the optical fiber 5 are calculated from the power and waveform of back-scattered light of probe light or idler light obtained (measurement 5), and $\Delta\beta$ and $\gamma$ are calculated from the calculated values Of $g_b$ and the pump light power.

Initially, calculate $g_b$. The $g_b$ of a sinusoidal waveform can be calculated by the same method as the method disclosed by L. F. Mollenauer et al. In this method, measured data is first passed through a band-pass filter to remove a frequency component other than a signal frequency component. Then, by performing fast Fourier transform (FFT), the negative frequency is replaced with zero. Next, by performing inverse fast Fourier transform (IFFT), the imaginary component of the measured data is calculated. Thereafter, phase angles at points in the fiber longitudinal direction are calculated from the real component and imaginary component. These phase angles are values corresponding to $g_b$. In this way, the values of $g_b$ at points in the fiber longitudinal direction with respect to input pump light power are obtained.

Next, calculate $\Delta\beta$ and $\gamma$ from the calculated values of $g_b$. First, the values of $4g_b^2$ are plotted with respect to the pump light power at points in the fiber longitudinal direction. By performing a fitting operation on these plots by using a straight line, the intercept and slope are found. As indicated in Eq. (23), that intercept represents $\Delta\beta^2$. At this time, if the slope of that straight line is positive, the dispersion in the optical fiber 5 at that point is normal dispersion. Conversely, in the case of negative, it is anomalous dispersion. And the absolute value of that slope is $4\Delta\beta\gamma$, so $\gamma$ can be obtained from the value of $\Delta\beta$ obtained from the aforementioned slope. Therefore, by performing this manipulation over the entire region in the longitudinal direction, it can be found how the wavelength dispersion, the positive and negative, and the nonlinear coefficient are distributed in the longitudinal direction.

In addition, for the waveform of the back-scattered light of each of pump light, probe light, and idler light to be measured, there are cases where at the connection parts of both ends of an optical fiber to be measured, reflection takes places and a peak occurs. Furthermore, there is a possibility that the waveform distortion of the rising part of a waveform on the side of incidence will cause errors during FFT analysis. Therefore, by removing predetermined portions of both ends of the obtained waveform and then making calculations, a total calculation error can be suppressed.

Figure 10:
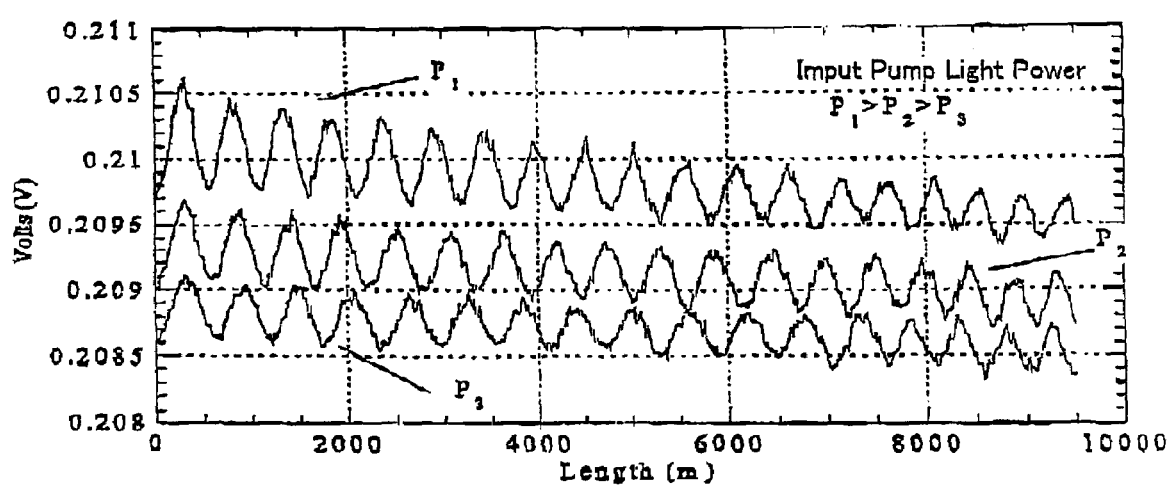
FIG. 10 is a diagram showing the waveforms of the back-scattered light of idler light measured when the power of input pump light is varied.
Figure 11:
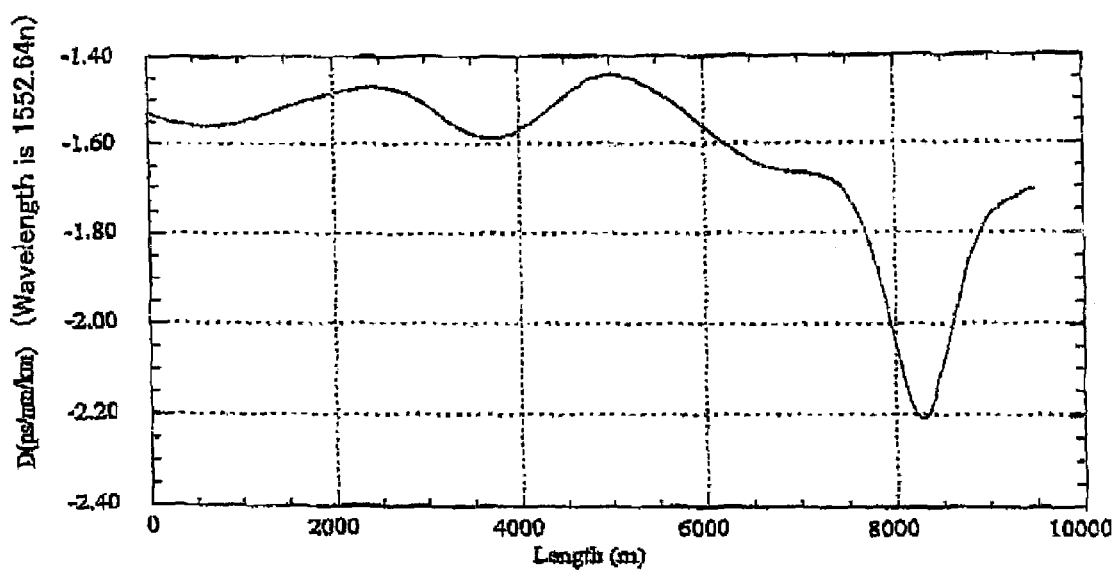
FIG. 11 is a diagram showing the wavelength-dispersion distribution in the longitudinal direction of a fiber obtained by the result of analyses.
Figure 12:
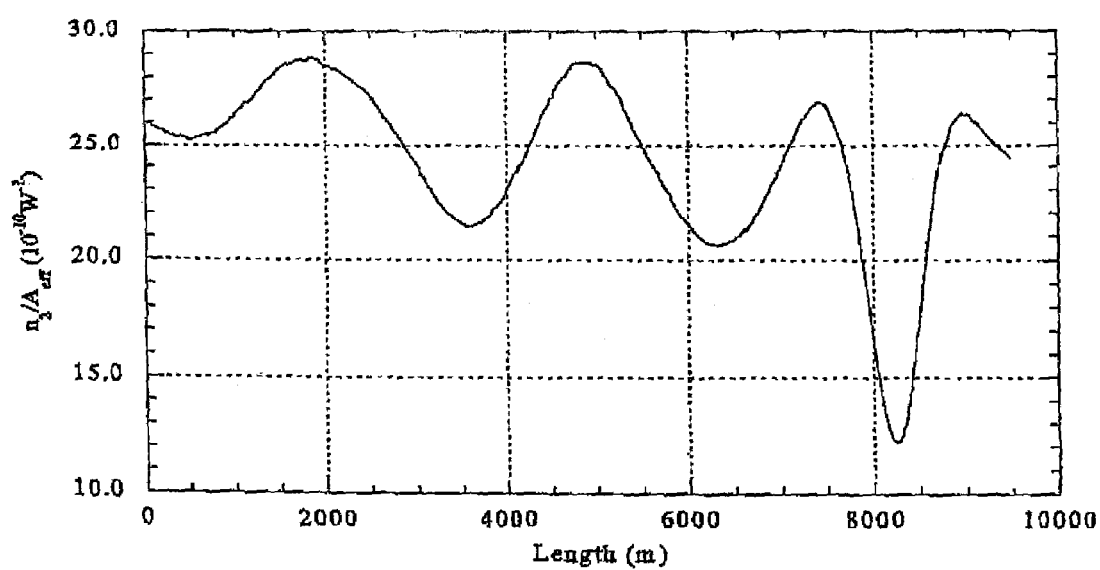
FIG. 12 is a diagram showing the nonlinear-coefficient distribution in the fiber longitudinal direction obtained by the result of analyses.

FIG. 10 shows the waveforms of the back-scattered light of idler light measured when the power of pump light to be input to a high nonlinearity fiber is varied. Also, FIG. 11 shows the wavelength-dispersion distribution in the longitudinal direction of a fiber obtained from the values shown in FIG. 10 by the above-described analysis method. FIG. 12 shows the nonlinear-coefficient distribution in the fiber longitudinal direction obtained from the values shown in FIG. 10 by the above-described analysis method.

Figure 13:
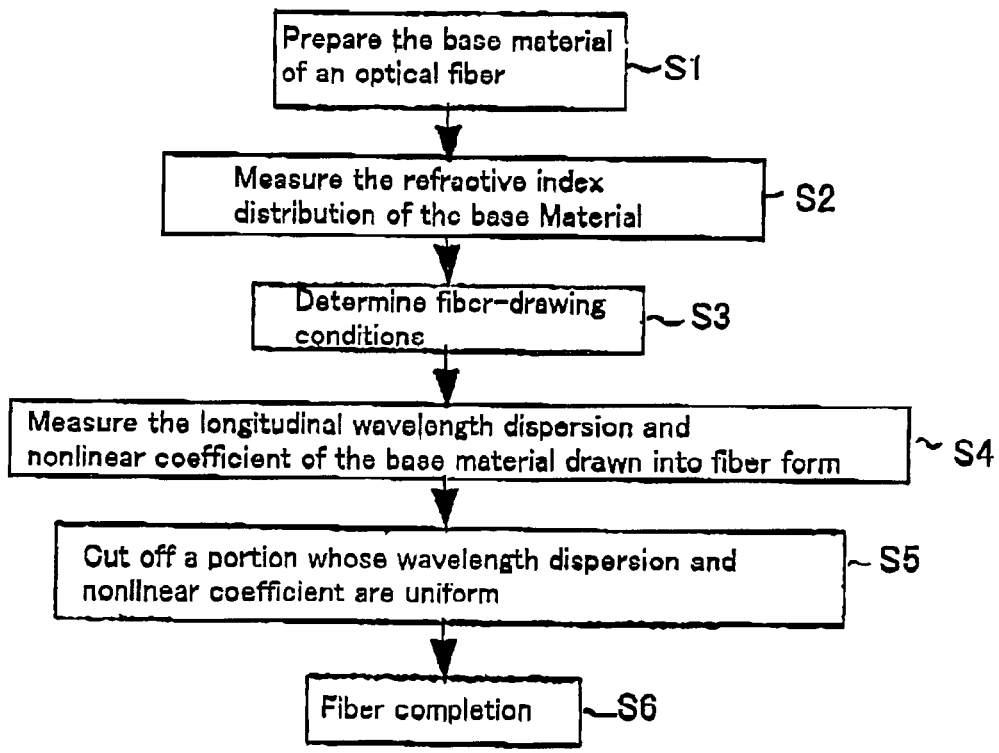
FIG. 13 is a flowchart used to explain the steps in an optical-fiber manufacturing method employed in the embodiments of the present invention.

With reference to FIG. 13, a description will be given of a method of manufacturing optical fibers, based on a method of measuring the wavelength dispersion and nonlinear coefficient in the longitudinal direction of an optical fiber by employing the above-described measurement system 100.

Initially, the base material of an optical fiber is prepared (step S1) and the distribution of refractive indexes of the base material is measured with a preform analyzer (step S2). Based on the result of measurement, fiber-drawing conditions (linear tensile strength, speed, temperature of a molten portion, etc.) are determined (step S3). The base material is drawn into fiber form, and for the obtained optical fiber, the wavelength-dispersion distribution and nonlinear-coefficient distribution in the fiber longitudinal direction are measured with the above-described measurement system 100. Independence on the result of evaluation, a portion of the fiber is cut off so that the longitudinal nonlinear-coefficient distribution and/or longitudinal wavelength-dispersion distribution are within a variation of ±5% with respect to an average value over the entire fiber length (step S5). Thus, in this embodiment, by measuring the wavelength dispersion and nonlinear coefficient in the longitudinal direction of an optical fiber, and cutting off a portion of the fiber so that the nonlinear coefficient and wavelength dispersion are optimum, optical fibers are manufactured which have uniform and stable wavelength dispersion and nonlinear coefficient, compared with conventional fibers (step S6).

Thus, according to the measurement system 100 of the first embodiment, the longitudinal nonlinear-coefficient distribution and wavelength-dispersion distribution of an optical fiber can be measured at the same time. In addition, proper methods of analysis are employed for 1.55-μm-band fibers having various types of wavelength dispersion, so the measurement system 100 is also applicable to optical fibers with various types of wavelength dispersion. Furthermore, by employing the above-described measurement method in the fiber-manufacturing process, optical fibers are obtained in which the properties are uniform and stable in the fiber longitudinal direction. Therefore, these optical fibers make a great contribution in designing dispersion-compensating lines and soliton-communication lines that are employed repeaterless long-distance transmission of strong light power employing erbium-doped fiber amplifiers, so the utilization value is great.

Instead of using the measurement system 100, other measurement systems may be used for measuring the wavelength-dispersion distribution and nonlinear-coefficient distribution in the longitudinal direction of the optical fiber 5. Measurement systems other than the measurement system 100 will hereinafter be described with reference to FIGS. 2 to 7.

Figure 2:
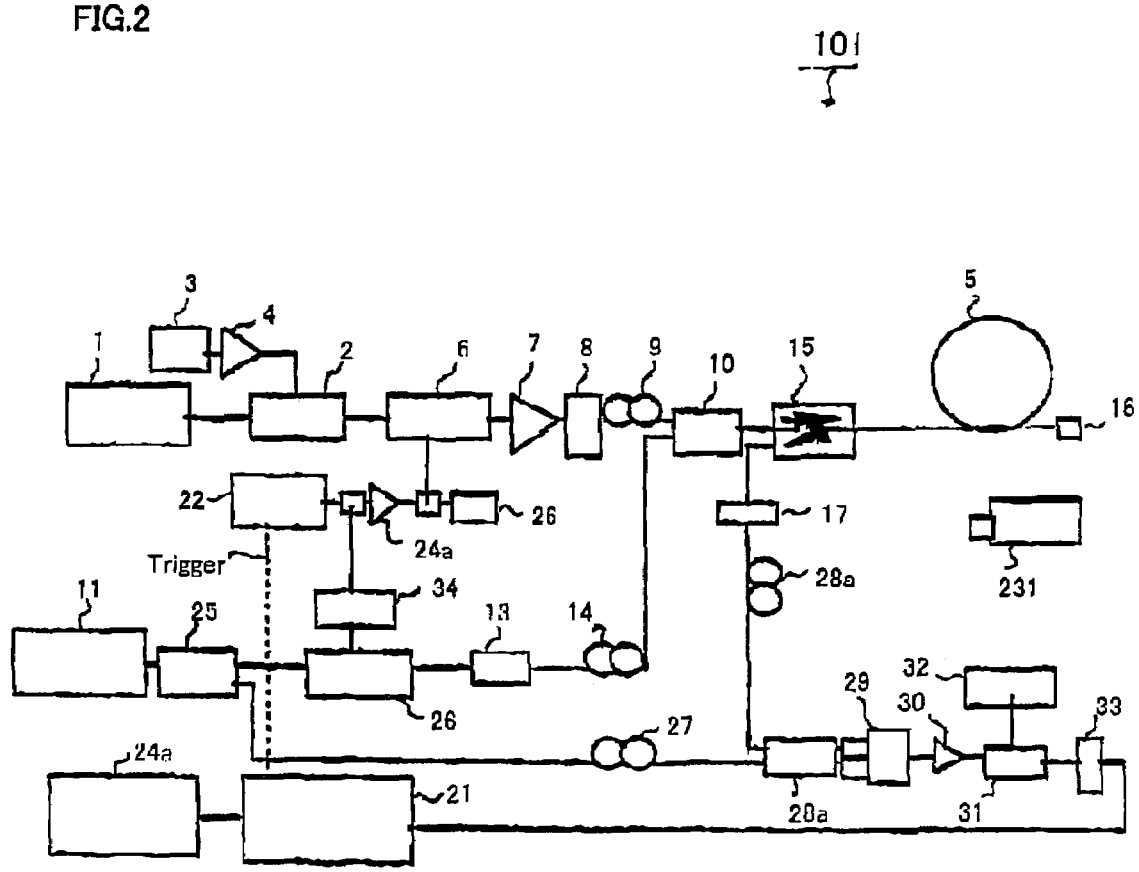
FIG. 2 is a block diagram showing a measurement system constructed in accordance with a second embodiment of the present invention.

Referring to FIG. 2, there is shown a measurement system 101 constructed in accordance with a second embodiment of the present invention. The measurement system 101 is constructed to receive probe light by employing an optical heterodyne detection method in order to enhance the sensitivity of the light-receiving side. In this case, probe light from a probe light source 11 is branched into first light and second light, The first light is pulsed by an acoustooptic (AO) modulator 26. At this time, the probe light is frequency-shifted by an amount of drive frequency. On the other hand, the second light passes through a polarization controller 27 and is input to a 3-dB coupler 28, disposed oh the light-receiving side. Thereafter, the back-scattered light of idler light from an optical fiber 5 is input to the 3-dB coupler 28 through a circulator 15, an optical filter 17, and a polarization controller 28a. Therefore, the branched light from tap coupler 25 and the back-scattered light of the idler light are coupled together at the 3-dB coupler 28. At this time, the polarization state of the light from the tap coupler 25 is caused to coincide with that of the back-scattered light of the idler light by the polarization controllers 27, 28a. The coupled light is branched into two light components, which are received by a double-balanced-type photodetector 29. An electric signal from the double-balanced-type photodetector 29 is amplified by an electric amplifier 30. At a mixer 31, the signal from the amplifier 30 is reduced to a base band by a frequency signal, corresponding to the drive frequency of the AO modulator 26, output from a signal generator 32. The signal from the mixer 31 is fed into an oscilloscope 21 through a low-pass filter 33. The oscilloscope 21 digitizes the input electric signal and inputs it to a computer 24, which performs a root-mean-square process on the input digital data.

Figure 3:
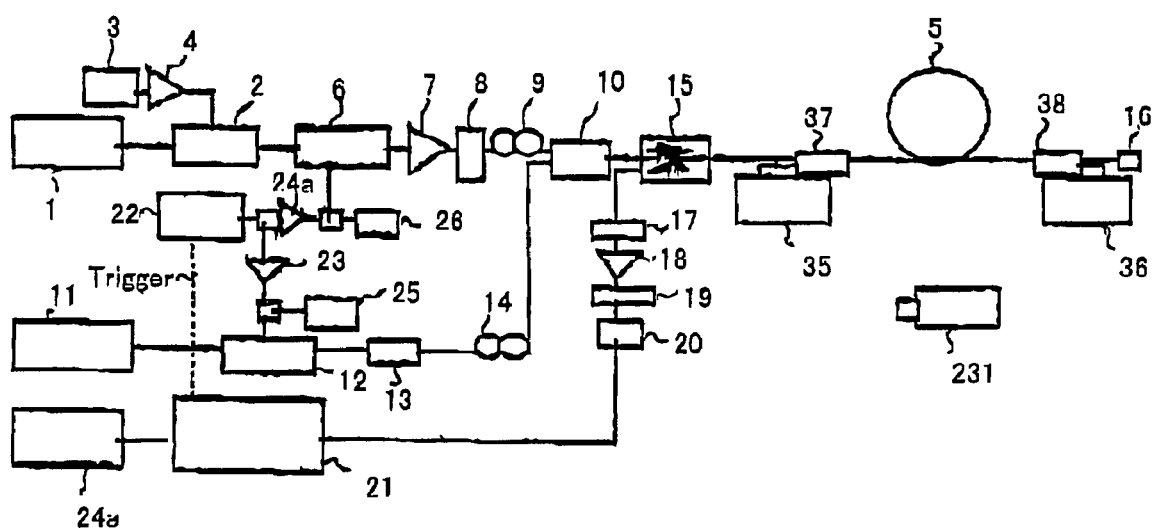
FIG. 3 is a block diagram showing a measurement system constructed in accordance with a third embodiment of the present invention.

Referring to FIG. 3, there is shown a measurement system 102 constructed in accordance with a third embodiment of the present invention. The measurement system 102 is constructed so that by causing third light different in wavelength from pump light and probe light to enter either end or both ends of an optical fiber 5, the powers of pump light, probe light, and idler light are Raman-amplified. Raman amplification is performed by Raman-amplified light input to both ends of the optical fiber 5 through two WDM couplers 37 and 38 from two Raman amplification light sources 35 and 36. In this case, the WDM coupler 38 may be a circulator. When the wavelengths of pump light and probe light are about 1550 nm, light with a wavelength of about 1450 nm is caused to enter the optical fiber 5. Raman amplification is effective when the fiber length of an optical fiber is long and when transmission losses are great.

Figure 4:
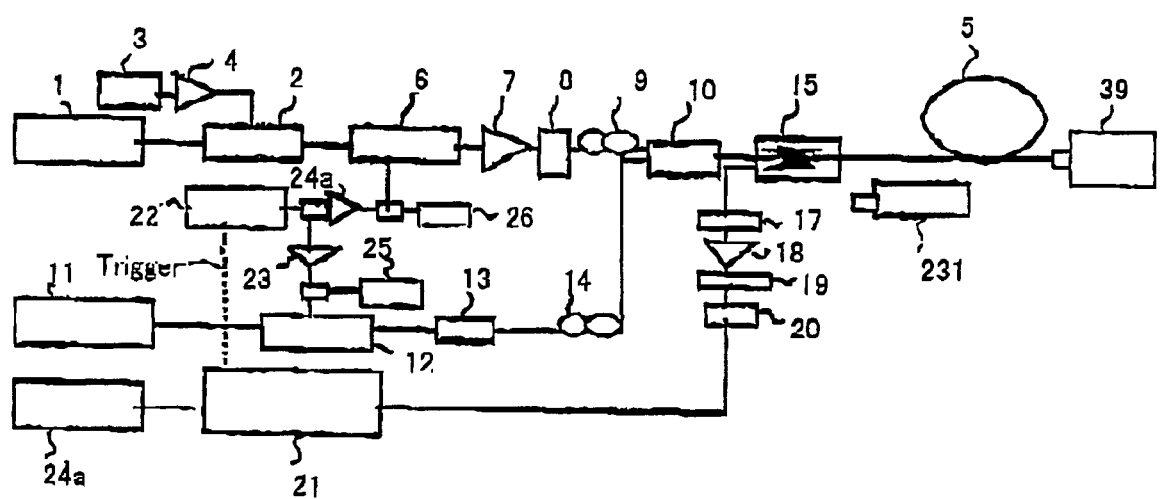
FIG. 4 is a block diagram showing a measurement system constructed in accordance with a fourth embodiment of the present invention.

Referring to FIG. 4, there is shown a measurement system 103 constructed in accordance with a fourth embodiment of the present invention. The measurement system 103 is characterized in that it is provided with a optical spectrum analyzer 39 on the pulse exit side of an optical fiber 5. With this optical spectrum analyzer 39, the power $P_c(z)$ of idler light from the pulse exit end of the optical fiber 5 can be measured. The conversion efficiency $G_c(=P_c(z)/P_c(0))$ of idler light can be calculated from the value of the power $P_c(z)$ measured. If measuring conditions are the same as the aforementioned measuring conditions, the conversion efficiencies in case 1 and case 2 are expressed by the following Equations:

Case 1: When $\Delta\beta<0$ (anomalous dispersion) and $P_p^0>-\Delta\beta/4\gamma$, $$G_c = \gamma^2 P_p(0)^2 \left[\frac{\sinh(g_a L)}{g_a}\right]^2 \quad (28)$$

Case 2: When $\Delta\beta<0$ (anomalous dispersion) and $P_p^0>-\Delta\beta/4\gamma$, or when $\Delta\beta\geq 0$ (normal dispersion), $$G_c = \gamma^2 P_p(0)^2 \left[\frac{\sinh(g_b L)}{g_b}\right]^2 \quad (29)$$

$$g_b = \frac{1}{2}[\Delta\beta(\Delta\beta+4\gamma P_p)]^{\frac{1}{2}}$$

As seen from Eqs. (28) and (29), the conversion efficiency $G_c$ of idler light varies in dependence on the power $P_p$ of pump light. Also, $\Delta\beta$ and $\gamma$ make a contribution to the variation. Therefore, in experiments, if a change in the conversion efficiency $G_c$ of the idler light from the exit end of the optical fiber 5 is calculated as the power of input pump light is made higher, information on the wavelength dispersion and nonlinear coefficient of the optical fiber 5 is obtained in the measured values. Therefore, by making a regression analysis (which employs Eqs. (28) and (29)) when the conditions in the cases 1 and 2 are met, two parameters $\Delta\beta$ and $\gamma$ can be determined. Based on the values of $\Delta\beta$ and $\gamma$, the average wavelength dispersion and nonlinear coefficient over the entire length of the optical fiber 5 are obtained.

Typically, there is present polarization mode dispersion in optical fibers. For that reason, even if the polarization state of pump light and the polarization state of probe light coincide with each other at the entrance end of the optical fiber connected to the circulator 15, the two polarization states vary as the pump light and probe light propagate through the optical fiber 5. Because of this, when measuring the optical fiber 5 whose length is long or the optical fiber 5 whose polarization mode dispersion is great, errors will occur between the powers $P_c(z)$ and $P_s(z)$ of idler light and probe light, and the functions shown in Eqs. (18), (19), (21) and (22), near the exit end of the optical fiber 5. In such a case, one end of the optical fiber 5 is connected to the circulator 15, and the wavelength-dispersion distribution and nonlinear-coefficient distribution in the fiber longitudinal direction are measured. Likewise, the other end of the optical fiber 5 is connected to the circulator 15, and the wavelength-dispersion distribution and nonlinear-coefficient distribution in the fiber longitudinal direction are measured. In this way, pump light and probe light are caused to enter both ends of the optical fiber 5, like measurements are made, and the two results of measurement are compared with each other. Thus, it becomes possible to select data where the effects of polarization mode dispersion are less, so the effects of polarization variation on optical fibers can be removed.

Figure 5:
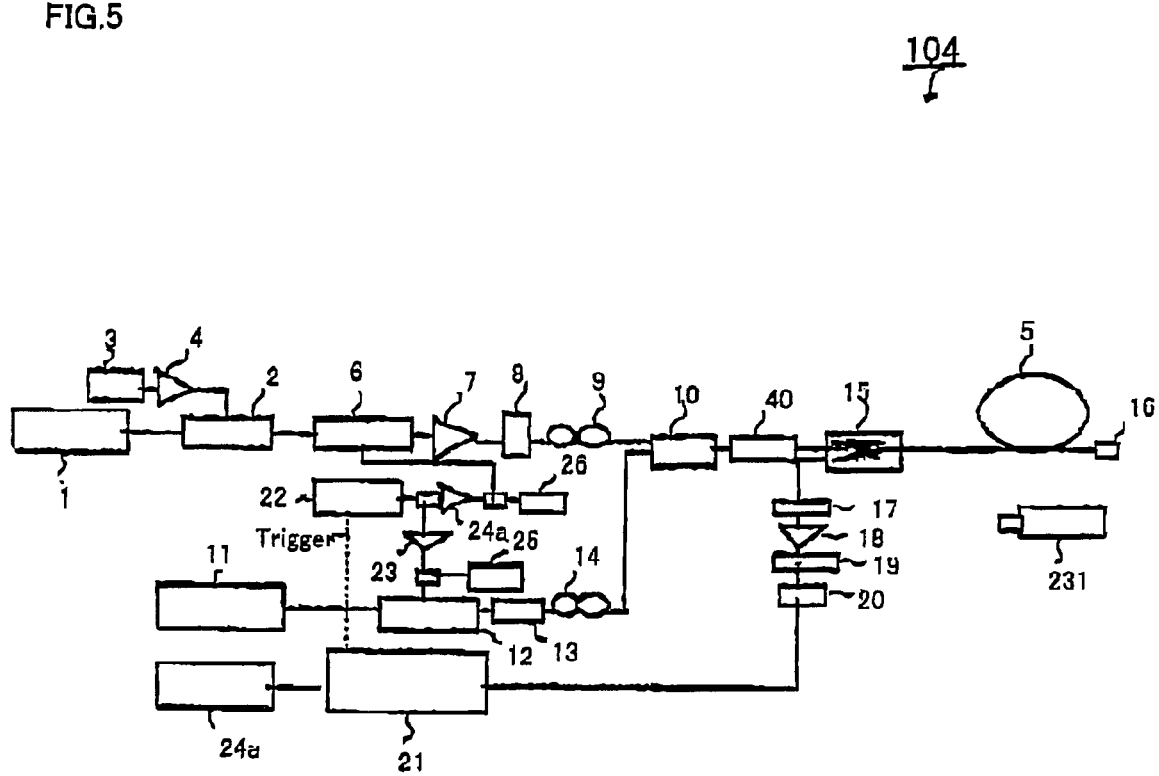
FIG. 5 is a block diagram showing a measurement system constructed in accordance with a fifth embodiment of the present invention.

Referring to FIG. 5, there is shown a measurement system 104 constructed in accordance with a fifth embodiment of the present invention. The measurement system 104 in the fifth embodiment further includes a nonlinear optical medium 40, which is disposed between a coupler 10 for coupling pulsed pump light and pulsed probe light, and an optical fiber 5. As set forth above, when measuring the back-scattered light of idler light, the power $P_c(z)$ (where z is near zero) of idler light rises sharply at the pulse entrance end of the optical fiber 5, so there is a great error between the measured power $P_c(z)$ (where z is near zero) and the solution $P_c(z)$ (where z is near zero) obtained by Eqs. (18) and (19). For that reason, the nonlinear optical medium 40 for generating weak idler light by nonlinear effects is provided in front of the optical fiber 5 so that a light waveform whose error is small is obtained at the light entrance end of the optical fiber 5. As the nonlinear optical medium 40, it is effective to use an optical fiber of high nonlinearity over a short distance.

Figure 6:
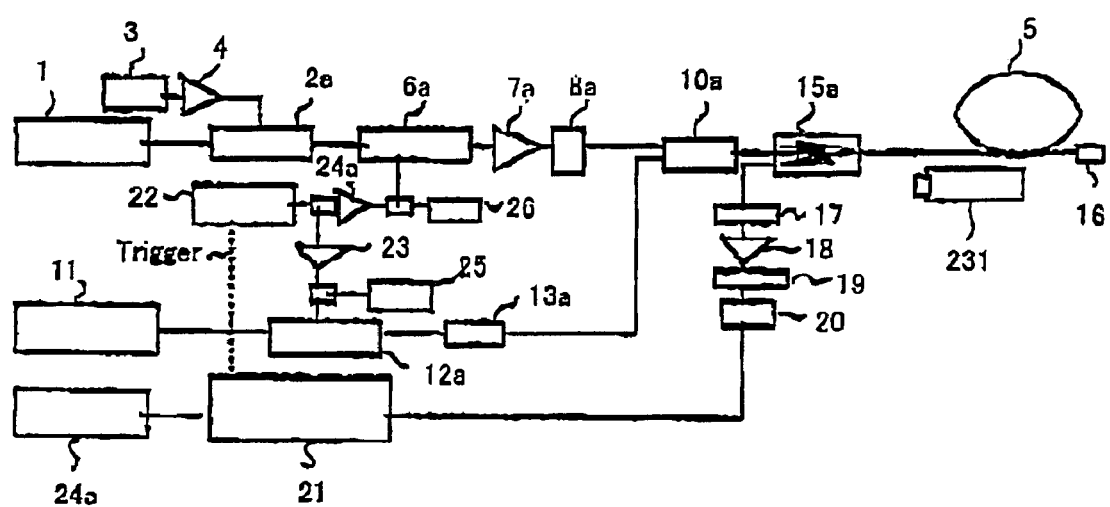
FIG. 6 is a block diagram showing a measurement system with a polarization holding function, constructed in accordance with a sixth embodiment of the present invention.

Referring to FIG. 6, there is shown a measurement system 105 constructed in accordance with a sixth embodiment of the present invention. The measurement system 105 is constructed so that in two transmission lines (a first transmission line for pump light consisting of a pump light source 1, a phase modulator 2, a power modulator 6, an erbium-dope fiber amplifier 7, a band-pass filter 8, a coupler 10, and a circulator 15, and a second transmission line for probe light consisting of a probe light source 11, a power modulator 12, a delay line 13, the coupler 10, and the circulator 15), the polarization planes of linearly polarized pump light and linearly polarized probe light become parallel to each other. Because of this, the phase modulator 2, power modulator 6, erbium-dope fiber amplifier 7, band-pass filter 8, coupler 10, power modulator 12, delay line 13, and circulator 15 are components having the property of holding polarization (particularly, they are represented as a phase modulator 2a, power modulator 6a, erbium-dope fiber amplifier 7a, band-pass filter 8a, coupler 10a, power modulator 12a, delay line 13a, and circulator 15a). The measurement system 105 further includes optical fiber transmission lines connected between these components. Thus, pulsed light of two wavelengths is emitted from the pump light source 1 and probe light source 11 so that the two polarization planes coincide with each other. With the polarization planes coinciding with each other, the pump light and probe light are caused to enter the optical fiber 5. This construction can prevent a reduction in the effects of four-wave mixing due to polarization variations.

Figure 7:
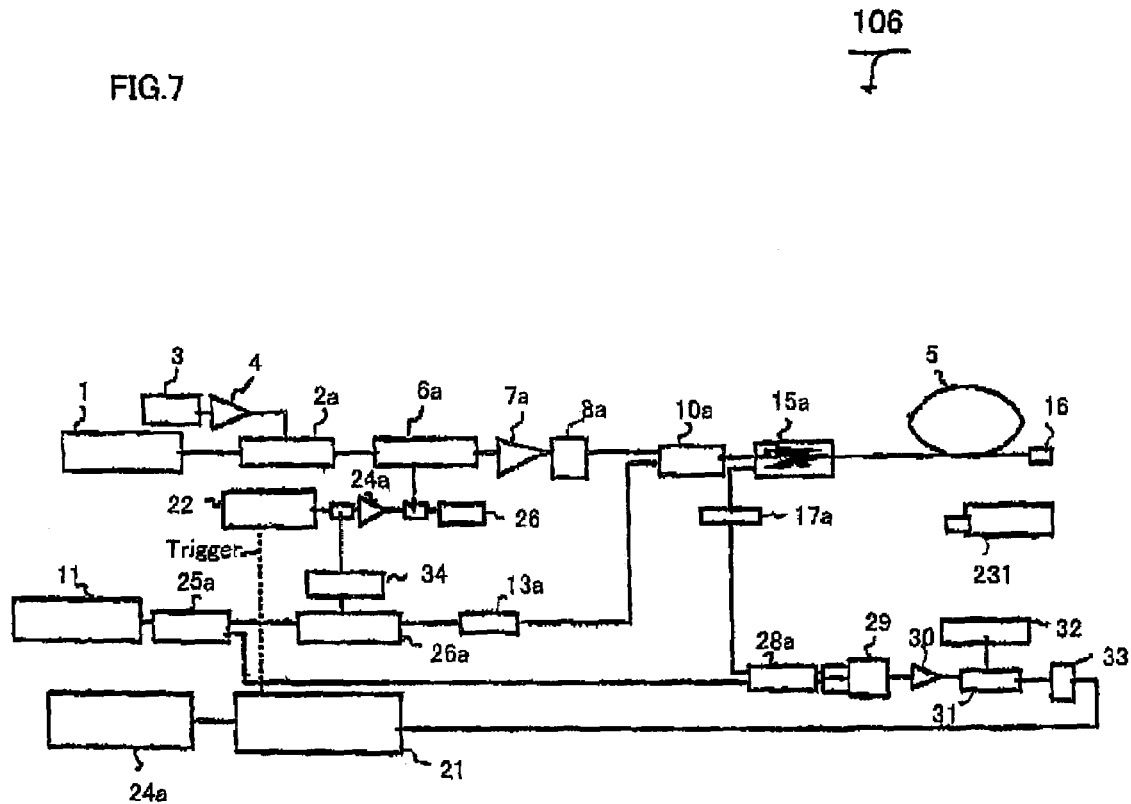
FIG. 7 is a block diagram showing a measurement system with a polarization holding function employing an optical heterodyne detection method, constructed in accordance with a seventh embodiment of the present invention.

Referring to FIG. 7, there is shown a measurement system 106 constructed in accordance with a seventh embodiment of the present invention. In addition to employing an optical heterodyne detection method (see FIG. 2) on the light-receiving side, the measurement system 106 is constructed so that in two transmission lines (a first transmission line for pump light consisting of a pump light source 1, a phase modulator 2, a power modulator 6, an erbium-dope fiber amplifier 7, a band-pass filter 8, and a coupler 10, and a second transmission line for probe light consisting of a probe light source 11, an AO modulator 26, a delay line 13, the coupler 10a, an optical fiber 17, a 3-dB coupler 28, a tap coupler 25, and the circulator 15), the polarization planes of linearly polarized pump light and linearly polarized probe light become parallel to each other. Because of this, the phase modulator 2, power modulator 6, erbium-dope fiber amplifier 7, band-pass filter 8, coupler 10, AO modulator 26, delay line 13, circulator 15, optical fiber 17, 3-dB coupler, and tap coupler 25 are components having the property of holding polarization (particularly, they are represented as a phase modulator 2a, power modulator 6a, erbium-dope fiber amplifier 7a, band-pass filter 8a, coupler 10a, AO modulator 26a, delay line 13a, circulator 15a, optical filter 17a, 3-dB coupler 28a, and tap coupler 25a). The measurement system 105 further includes optical fiber transmission lines connected between these components. Therefore, at the light-receiving part employing the optical heterodyne detection method, the polarization state of pump light and the polarization state of probe light, output from the two pulsed light sources 1 and 11, always coincide with that of the back-scattered light from the optical fibers, so stable reception can be realized.

In the first embodiment, while FFT and IFFT have been employed in calculating $g_b$, the present invention is not limited to this. For example, the following method may be employed.

Figure 14:
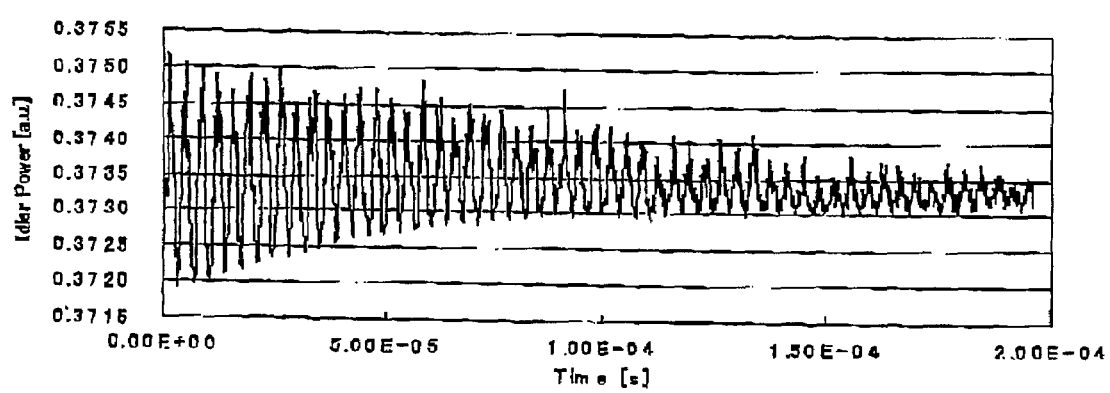
FIG. 14 is a diagram showing the waveform measured by an optical time-domain reflectometer (OTDR)

By extracting a sequence of data points from data (waveform data) measured by an optical time-domain reflectometer (OTDR) and nonlinearly fitting the extracted data points to a sinusoidal function, local dispersion can be calculated. And by changing a range of data to be extracted as occasion demands and performing the fitting operation, wavelength-dispersion distribution in the fiber longitudinal direction can be calculated. In FIG. 14 there is shown a waveform having 3743 data points in total. For instance, consecutive 201 points near the center from the $1800^{th}$ point to the $2000^{th}$ point are extracted. Assuming the extracted 200 points have a single cycle, a change in the power can be expressed by the following Eq. (30):

$$F(z, a_1) = a_1 \cdot \sin^2(a_2 \cdot z + a_3) + a_4 \tag{30}$$

Eq. (30) undergoes a nonlinear fitting operation. In this Equation, z and $a_2$ are parameters regarding position and dispersion, $a_1$ is an amplitude parameter, $a_3$ is a phase offset parameter, and $a_4$ is a power offset parameter. These are used as fitting parameters when necessary.

Using parameter $a_2$, wavelength dispersion can be calculated by the following Eq. (31), $$D = -\frac{a_2}{\pi c}\left(\frac{\lambda_s}{\Delta\lambda}\right)^2 \tag{31}$$

The calculated dispersion is assumed to be the dispersion at the center position of the above-described range of data extracted (i.e., the dispersion at the $1900^{th}$ point). The initial value of the parameter $a_2$ employs a cycle obtained by a Fourier transform without a filter, but the initial value may be a value near dispersion. A method of prediction does not matter.

Figure 15:
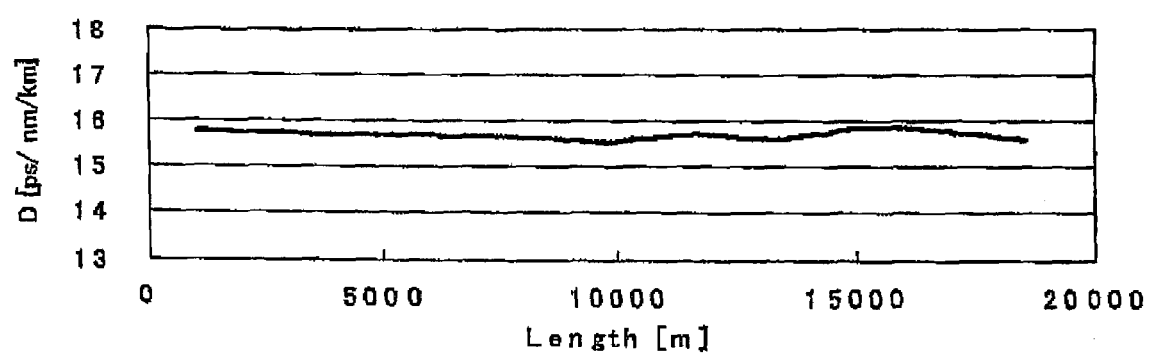
FIG. 15 is a diagram showing dispersion distribution calculated by a direct fitting method.

Next, by changing a range of data to be extracted, data points from the $1801^{st}$ point to the $2001^{st}$ point, for example, are extracted. Similarly, by performing a nonlinear fitting operation, wavelength dispersion is calculated. The calculated wavelength dispersion is assumed to be the wavelength dispersion at the $1901^{st}$ point. After the data range is changed, the initial value of parameter $a_2$ employs the result of calculation obtained before the data range is changed. Similarly, by changing the data range and performing a nonlinear fitting operation, local wavelength is calculated. Therefore, the wavelength dispersion at points in the fiber longitudinal direction is calculated. Thus, the wavelength-dispersion distribution in the fiber longitudinal direction is obtained. FIG. 15 shows wavelength-dispersion distribution calculated from the waveform of FIG. 14 by a direct fitting method, the wavelength-dispersion distribution being precisely calculated.

The data range to be extracted may be a suitable range set from the trade-offs between distance resolution and accuracy. From the nature of the fitting operation, the data range to be extracted has sufficient accuracy when power oscillation is about 1 to 10 cycles.

In addition, Eq. (30) is particularly effective when wavelength dispersion approximates to a constant in a fitting data range to be extracted, but in the case where wavelength dispersion varies greatly in the fiber longitudinal direction, it is preferable to employ an equation where within a fitting data range to be extracted, wavelength dispersion is distributed in linear dependence on distance. Furthermore, when the amplitude of power oscillation also varies within a fitting data range to be extracted, there are cases where the addition of a first-order parameter for that amplitude is preferred. For first-order parameters, the following Eq. (32) may be employed.

$$F(z, a_1, b_1) = [a_1 + b_1 z] \cdot \sin^2\left(\left[a_2 + \frac{b_2}{2}z\right] \cdot z + a_3\right) + a_4 \tag{32}$$

in which $b_1$ represents amplitude and $b_2$ represents wavelength dispersion.

Next, a description will be given of a means of correcting for wavelength dispersion calculated from the wave cycle of measured data, by employing the approximate error of an approximate express employed in measurement.

The waveform measured by an optical time-domain reflectometer (OTDR) is based on the assumption that it is expressed by Eq. (30), but Eq. (30) is derived from a differential equation employing the approximation that idler light generated by FWM is sufficiently small with respect to input light. Therefore, the dispersion D, and the parameter a2 about the cycle of the power oscillation of idler light, do not meet Eq. (2) strictly. Particularly, in a system whose nonlinear phenomenon is strong, such as when input light is strong and when the nonlinear coefficient of an optical fiber to be measured are great, the power of idler light is great and becomes easy to observe, but approximation errors become great. If wavelength dispersion, calculated by a nonlinear fitting operation with Eqs. (30) and (31) from power-varied data obtained by a simulation of solving a strict differential equation that has predetermined wavelength dispersion, is compared with the wavelength dispersion used in that simulation, the relational expression between errors and parameters is obtained. For instance, assume that the ratio of an input pump light quantity and an input signal light quantity is 1:2. And if parameter A is defined by the following Eq. (33):

$$A_{[ps \cdot nm]} = \frac{\Delta \lambda_{[nm]}^2 \cdot D_{[ps/nm/km]}}{\gamma_{[/w/km]} \cdot P_{p[W]}} \tag{33}$$

an error in wavelength dispersion becomes $$Error_{[ps/nm/km]} \sim 23.80_{[ps^2 \cdot nm^2]} \cdot \frac{\gamma_{[/W/km]}^2 \cdot P_{p[W]}^2}{\Delta \lambda_{[nm]}^4 \cdot D_{[ps/nm/km]}} \tag{34}$$

when the value of A is 10 or more, An error between the true value of wavelength dispersion and the value of wavelength dispersion calculated from the waveform measured by an optical time-domain reflectometer (OTDR) is calculated by Eq. (34). Therefore, by calculating an error from a measured value and compensating for the calculated error, it becomes possible to calculate the true value of wavelength dispersion.

For example, if an optical fiber with a wavelength dispersion of 2.00 ps/nm/km and a nonlinear coefficient of $\gamma$=2.025/km/w is measured with the conditions the power of input pump light is $P_p$=200 mW, the power of input signal light is $P_s$=400 mW, and that the wavelength spacing between the input pump light and the input signal light is 2.298 nm, an error is 0.07 ps/nm/km. That is, if wavelength dispersion is calculated from a measured waveform by Eqs. (30) and (31), it is 2.07 ps/nm/km. Therefore, when measured wavelength dispersion is 2.07 ps/nm/km, an accurate value of 2.00 ps/nm/km can be calculated by subtracting an error of 0.07 ps/nm/km from the measured value 2.07 ps/nm/km containing that error.

In Eq. (34), an error in wavelength dispersion can be calculated from the above-described nonlinear coefficient, input pump light power, input signal light power, and spacing between the wavelength of the input pump light and input signal light, but if $P_c$ represents the wave amplitude of idler light when a Rayleigh scattering coefficient is $10^{-4}$, and fiber loss is assumed to be zero, the above-described error can be expressed as:

$$Error_{[ps/nm/km]} \sim 1.94 \times \tag{35}$$
$$10_{[ps^3 \cdot nm^{\frac{2}{3}}]}^3 \cdot D_{[ps/nm/km]} \cdot \left( \frac{\gamma_{[/W/km]} \cdot P_{c[W]}}{D_{[ps/nm/km]} \cdot \Delta \lambda_{[nm]}^2} \right)^{\frac{2}{3}}$$

$$Error_{[ps/nm/km]} \sim 1.83 \times 10^4 \cdot D_{[ps/nm/km]} \cdot \frac{P_{c[W]}}{P_{p[W]}} \tag{36}$$

Because of this, a compensation for an error in measured wavelength dispersion can be made by employing the nonlinear coefficient, the observed wave amplitude of idler light, and the wavelength spacing of the two inputs. In addition, a compensation for an error in measured wavelength dispersion can be made by only the input pump light power and observed wave amplitude of idler light. Particularly, if Eq. (36) is employed, a compensation for an error can be made without calculating a nonlinear coefficient, so it is useful. That is, if Eq. (36) is employed, the wave amplitude of idler light is 4×10−4 mW with the same measuring conditions as the aforementioned conditions, so an error of 0.07 ps/nm/km can be calculated with the wave amplitude of input pump light $P_p$=200 mW when wavelength dispersion is 2.00 ps/nm/km, without employing a nonlinear coefficient in the calculation.

Conversely, in the case where the ratio of the light quantity of input pump light and the light quantity of input signal light is 1:2, when measuring the wavelength dispersion of an optical fiber in which the wavelength dispersion is 2.00 ps/nm/km and the nonlinear coefficient is $\gamma$=2.025/km/W, it is found that if the wavelength spacing is made great, or if the wave amplitude of input pump light is made small, an error becomes smaller. An approximation error is inversely proportional to the fourth power of wavelength spacing and is proportional to the square of the power of input pump light. However, since idler light becomes small in proportion to the square of input pump light power, the wave amplitude of input pump light is determined within a range where idler light is measurable.

Therefore, in order to calculate the cycle of local power oscillation of measured data, by directly performing a nonlinear fitting operation with a sinusoidal function, the influence of noise can be removed and accuracy of analysis can be enhanced. In addition, the analysis of directly performing a nonlinear fitting operation makes a filter process unnecessary and is easy to handle, so analysis becomes easy. A compensation for an approximate error is made by inverse operation, so it becomes possible to increase accuracy of analysis. Moreover, because measurement errors can be made small by selecting assumed conditions where an approximation error is small, accuracy of measurement is enhanced.

While the present invention has been described with reference to the preferred embodiments thereof, the invention is not to be limited to the details given herein, but may be modified within the scope of the invention hereinafter claimed.

What is claimed is:

1. A measurement method comprising the steps of:
   generating pulsed probe light linearly polarized, and pulsed pump light that is different in wavelength from said probe light but has the same polarization state;

causing said probe light and said pump light to enter an optical fiber to be measured;

measuring power oscillation of back-scattered light of said probe light caused by Rayleigh scattering, or power oscillation of back-scattered light of idler light caused by nonlinear effects generated within said optical fiber;

obtaining an instantaneous frequency of the measured power oscillation;

obtaining dependency of said instantaneous frequency relative to the power oscillation of said pump light in a longitudinal direction of said optical fiber;

obtaining a rate of change in said longitudinal direction between phase-mismatching conditions and nonlinear coefficient of said optical fiber, from the dependency of said instantaneous frequency; and simultaneously specifying distributions in said longitudinal direction of the wavelength dispersion and nonlinear coefficient of said optical fiber, based on the rate of change.

2. The measurement method as set forth in claim 1, wherein a discrimination between the positive and negative of said wavelength dispersion in the longitudinal direction of said optical fiber is made by employing conditions on wavelengths and powers of said pulsed pump light and pulsed probe light that are input to said optical fiber.

3. The measurement method as set forth in claim 2, wherein average wavelength dispersion and average nonlinear coefficient of the entire optical fiber are simultaneously specified by measuring an average value of the power oscillation of said idler light at a pulse exit side of said optical fiber, measuring dependency of the conversion efficiency of said idler light relative to the power oscillation of input pulsed pump light on the basis of the measure average value, and performing a regression analysis of said conversion efficiency with a logic function representing the conversion efficiency of the idler light dependent on the power oscillation of the pump light on the basis of the measured dependency.

4. The measurement method as set forth in claim 1, wherein influence of variations in polarization within said optical fiber is removed by measuring longitudinal wavelength-dispersion distribution and longitudinal nonlinear-coefficient distribution at both ends of said optical fiber and comparing the measured two distributions.

5. The measurement method as set forth in claim 1, wherein predetermined amounts of data near both ends of said optical fiber are deleted from the power oscillation data of said idler light or pulsed probe light, and said power oscillation data after the deletion are analyzed.

* * * * *